United States Patent
Tay

(10) Patent No.: US 9,958,064 B2
(45) Date of Patent: May 1, 2018

(54) FAST INDEXING MECHANISMS FOR CVT'S

(71) Applicant: Armin Sebastian Tay, West Covina, CA (US)

(72) Inventor: Armin Sebastian Tay, West Covina, CA (US)

( * ) Notice: Subject to any disclaimer, the term of this patent is extended or adjusted under 35 U.S.C. 154(b) by 486 days.

(21) Appl. No.: 14/557,454

(22) Filed: Dec. 2, 2014

(65) Prior Publication Data
US 2015/0135895 A1 May 21, 2015

Related U.S. Application Data

(63) Continuation-in-part of application No. 14/082,146, filed on Nov. 17, 2013.

(60) Provisional application No. 62/083,309, filed on Nov. 24, 2014, provisional application No. 62/065,748, filed on Oct. 19, 2014, provisional application No.
(Continued)

(51) Int. Cl.
*F16H 63/06* (2006.01)
*F16H 9/08* (2006.01)
*F16H 63/38* (2006.01)

(52) U.S. Cl.
CPC .......... *F16H 63/065* (2013.01); *F16H 63/38* (2013.01); *F16H 9/08* (2013.01); *Y10T 74/1424* (2015.01)

(58) Field of Classification Search
CPC .... F16H 63/065; F16H 63/062; F16H 63/067; F16H 63/06; F16H 63/3408; F16H 63/3425; F16H 63/3433; F16H 63/3441; F16H 63/3458; F16H 63/3466; F16H 63/3475; F16H 63/3483; F16H 63/38; F16H 9/12; F16H 9/10; F16H 9/08; F16H 9/125; F16H 9/14; F16H 9/16; F16H 2009/163; F16H 2009/166; F16H 61/662; F16H 61/6624; F16H 61/66236; F16H 2061/66295; F16H 2061/247; F16H 2061/283; F16H 55/54; F16H 55/56; Y10T 74/1424; Y10T 74/1412; Y10T 74/1494; Y10T 74/1488; Y10T 74/165; Y10T 74/18224; Y10T 74/18088–74/1812; Y10T 74/20636; Y10T 74/20654; Y10T 74/20672; Y10T 74/20678; Y10T 74/2113; Y10T 74/2011; Y10T 74/20128; Y10T 74/20116; Y10T 74/20104; Y10T 74/20091; Y10T 74/20085; G05G 5/18; G05G 5/24; G05G 5/05; F15B 15/061

See application file for complete search history.

(56) References Cited

U.S. PATENT DOCUMENTS 2,074,997 A * 3/1937 Faltermayer .............. F16H 9/16
                                                         474/24
2,344,341 A * 3/1944 Coen ........................ F16H 9/08
                                                         474/53
(Continued)

FOREIGN PATENT DOCUMENTS

FR            -692833 A  * 11/1930

*Primary Examiner* — Daniel D Yabut
(74) *Attorney, Agent, or Firm* — Chen-Chi Lin

(57) ABSTRACT

A fast indexing mechanism that can be used to quickly and accurately change the axial position of a cone of a CVT. Said indexing mechanism comprises of a Rotation Providing Mechanism that is powered by springs that are tensioned by a pneumatic/hydraulic actuator (see FIGS. 41 and 42), a Rotation to Linear Converting Mover Mechanism (see FIG. 44), and an Indexing and Clutching Mechanism (see FIG. 43).

6 Claims, 27 Drawing Sheets

Related U.S. Application Data

62/060,023, filed on Oct. 6, 2014, provisional application No. 62/056,625, filed on Sep. 29, 2014, provisional application No. 62/054,328, filed on Sep. 23, 2014, provisional application No. 62/053,183, filed on Sep. 21, 2014, provisional application No. 62/051,301, filed on Sep. 17, 2014, provisional application No. 62/051,845, filed on Sep. 17, 2014, provisional application No. 62/051,198, filed on Sep. 16, 2014, provisional application No. 62/018,632, filed on Jun. 29, 2014.

(56) References Cited

U.S. PATENT DOCUMENTS

| | | | | |
|---|---|---|---|---|
| 3,385,124 | A * | 5/1968 | Araki | D01H 1/365 474/71 |
| 5,517,876 | A * | 5/1996 | Genise | F16H 63/304 192/109 A |
| 7,713,153 | B2 | 5/2010 | Naude | |
| 7,722,490 | B2 | 5/2010 | Tay | |
| 2002/0040839 | A1 * | 4/2002 | Thyselius | B60T 1/005 192/219.5 |
| 2006/0252589 | A1 * | 11/2006 | Tay | F16H 9/08 474/83 |
| 2008/0058137 | A1 * | 3/2008 | Tay | F16H 9/08 474/83 |
| 2008/0127772 | A1 * | 6/2008 | Sauter | B60T 1/005 74/575 |
| 2008/0250718 | A1 * | 10/2008 | Papanikolaou | E05L 81/14 49/287 |
| 2010/0062884 | A1 * | 3/2010 | Tay | F16H 9/08 474/25 |
| 2013/0023366 | A1 | 1/2013 | Tay | |
| 2013/0130854 | A1 | 5/2013 | Tay | |
| 2013/0310205 | A1 | 11/2013 | Tay | |
| 2014/0213398 | A1 | 7/2014 | Tay | |
| 2014/0235385 | A1 | 8/2014 | Tay | |
| 2014/0235389 | A1 | 8/2014 | Tay | |

\* cited by examiner

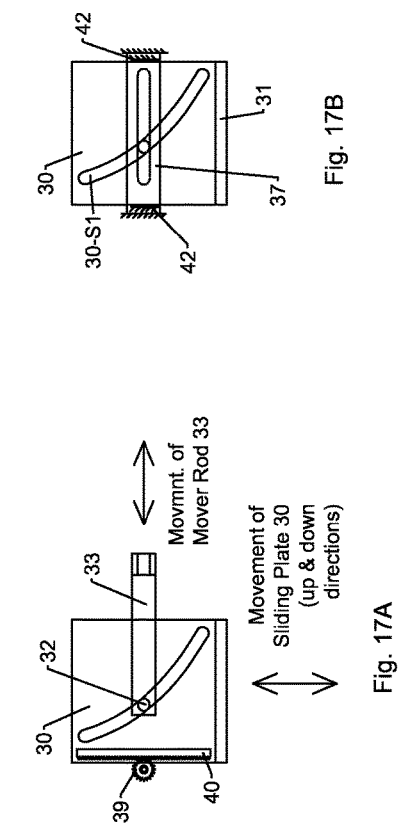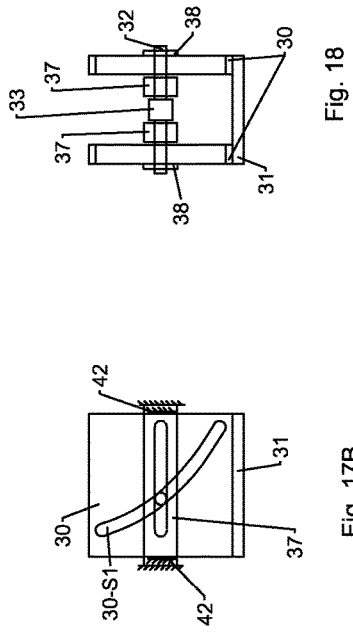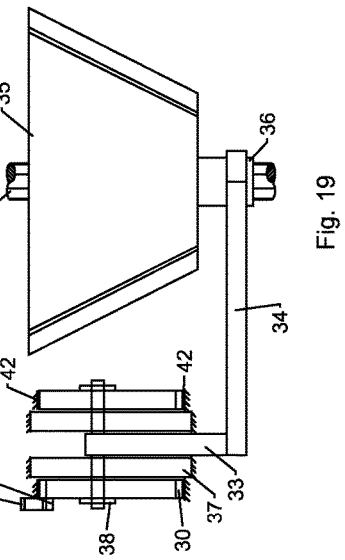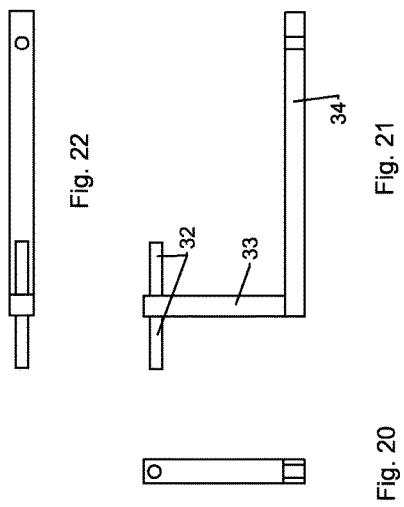

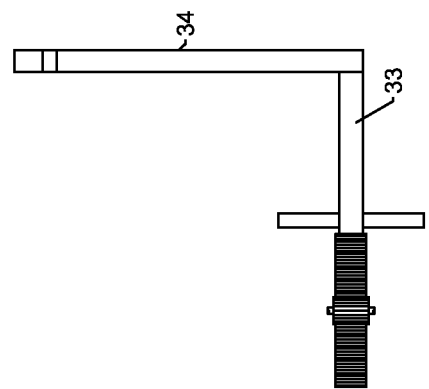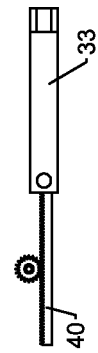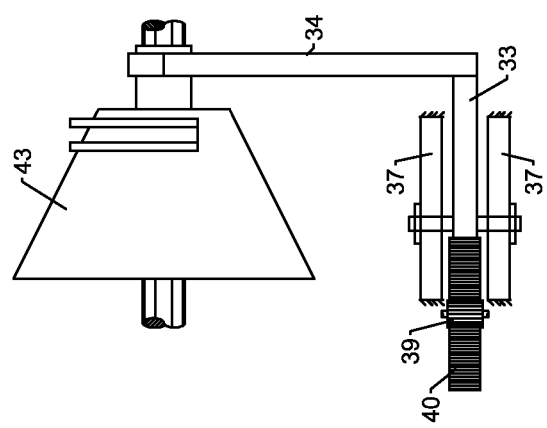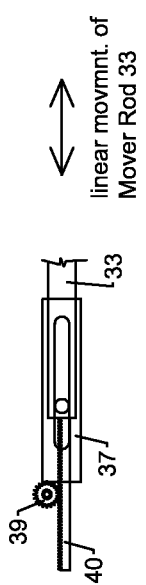

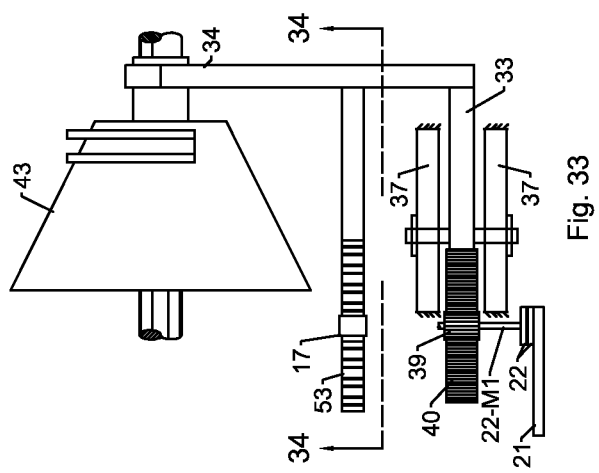
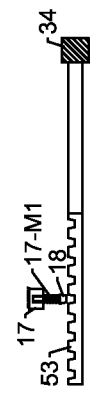
Fig. 33
Fig. 34

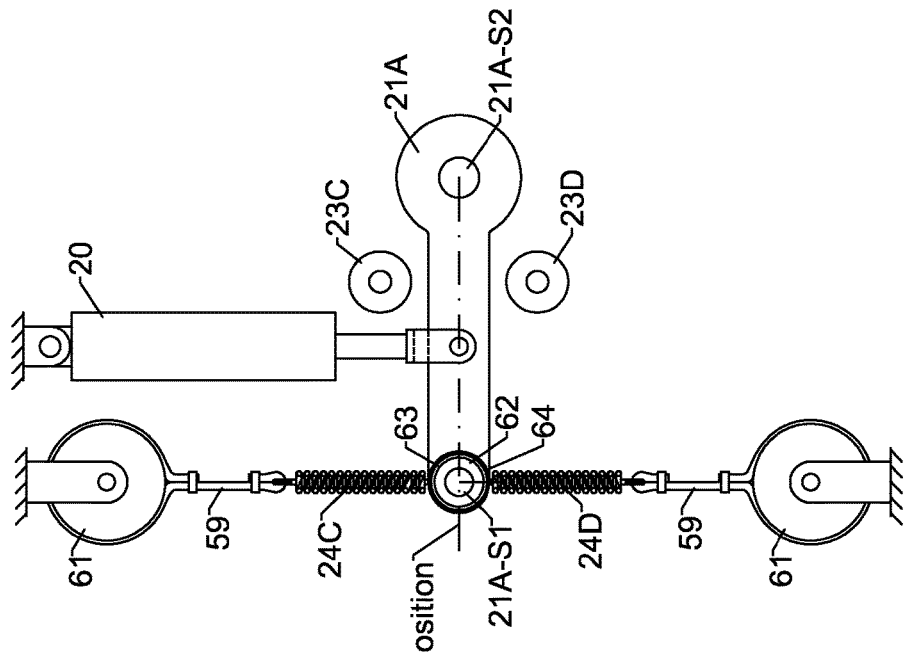
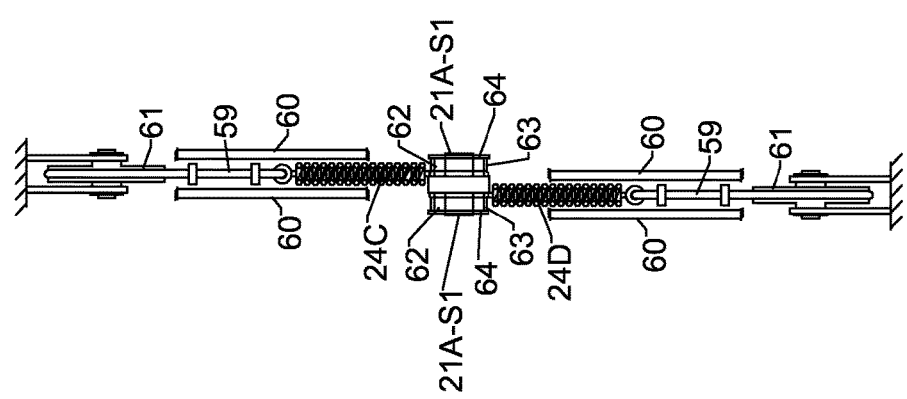

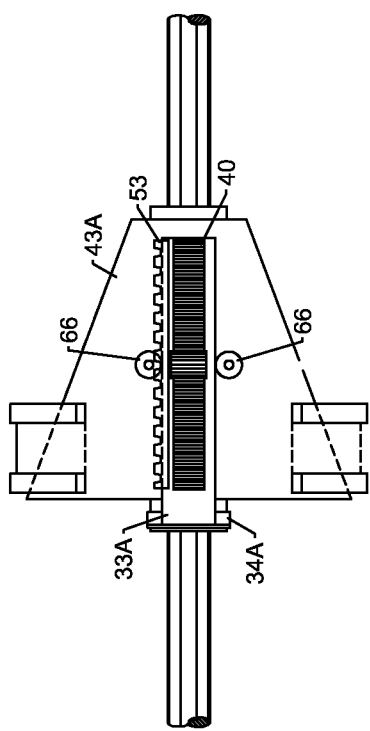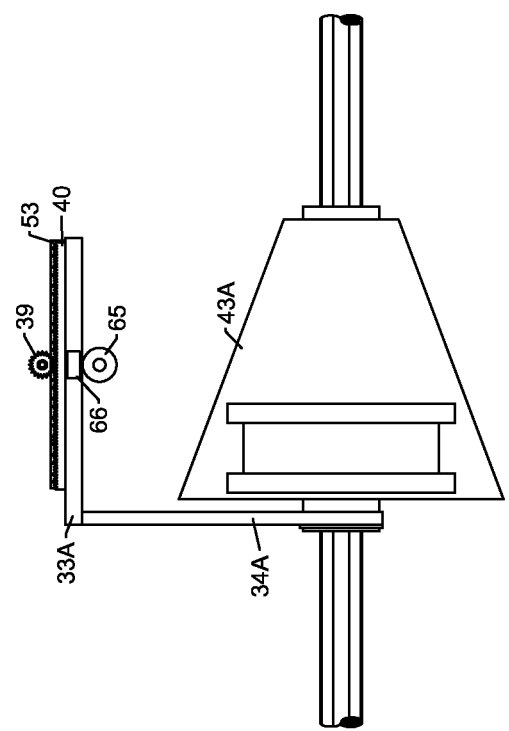
Fig. 45
Fig. 44

FAST INDEXING MECHANISMS FOR CVT'S

CROSS-REFERENCE TO RELATED APPLICATIONS

This invention is a Continuation-in-part (CIP) of U.S. patent application Ser. No. 14/082,146, which was filed on 17 Nov. 2013; in addition, this invention is entitled to the benefits of:
- Provisional Patent Application (PPA) Ser. No. 62/083,309 filed on 24 Nov. 2014;
- Provisional Patent Application (PPA) Ser. No. 62/065,748 filed on 19 Oct. 2014;
- Provisional Patent Application (PPA) Ser. No. 62/051,198 filed on 16 Sep. 2014;
- Provisional Patent Application (PPA) Ser. No. 62/060,023 filed on 6 Oct. 2014;
- Provisional Patent Application (PPA) Ser. No. 62/051,301 filed on 17 Sep. 2014;
- Provisional Patent Application (PPA) Ser. No. 62/056,625 filed on 29 Sep. 2014;
- Provisional Patent Application (PPA) Ser. No. 62/053,183 filed on 21 Sep. 2014;
- Provisional Patent Application (PPA) Ser. No. 62/054,328 filed on 23 Sep. 2014;
- Provisional Patent Application (PPA) Ser. No. 62/051,845 filed on 17 Sep. 2014;
- Provisional Patent Application (PPA) Ser. No. 62/018,632 filed on 29 Jun. 2014.

The following patent and patent applications have no legal bearing on this application; they describe items mentioned in this application (i.e. cone with one torque transmitting member), but the subject matter claimed is different and/or has not been previously disclosed:
- U.S. Pat. No. 7,722,490 B2, which was filed on Oct. 29, 2007;
- U.S. patent application Ser. No. 13/629,613, which was filed on Sep. 28, 2012;
- U.S. patent application Ser. No. 13/730,958, which was filed on Dec. 29, 2012;
- U.S. patent application Ser. No. 13/889,049, which was filed on May 7, 2013;
- U.S. patent application Ser. No. 14/242,899, which was filed on Apr. 2, 2014;
- U.S. patent application Ser. No. 14/182,306, which was filed on Feb. 18, 2014;
- U.S. patent application Ser. No. 14/186,853, which was filed on Feb. 21, 2014.

BACKGROUND

Field of Invention

This invention relates to pneumatic/hydraulic assisted mechanisms that can be used to move an object of considerable weight in quick and accurate steps, specifically to pneumatic/hydraulic assisted mechanisms that can be used to move a cone of a continuous variable transmission in quick and accurate steps.

Description of Prior Art

The inventions of this disclosure are applicable to friction dependent and non-friction dependent CVT's constructed out of the cones and cone assemblies described in U.S. Pat. No. 7,722,490 B2 and U.S. patent application Ser. No. 13/730,958, which are: a "single tooth cone", a "cone with two opposite teeth", a "cone with one torque transmitting member", a "cone with two opposite torque transmitting members", a "cone with one slide-able tooth", and a "cone with two opposite slide-able teeth".

Two "cone with two opposite teeth", two "cone with two opposite torque transmitting members", or two "cone with two opposite slide-able teeth" can be used to construct a CVT 1. Two "single tooth cone", two "cone with one torque transmitting member", or two "cone with one slide-able tooth" can be used to construct a CVT 2. One "cone with two opposite teeth", one "cone with two opposite torque transmitting members", or one "cone with one slide-able tooth" can be used to construct a CVT 3. And two "cone with one torque transmitting member" can be used to construct a CVT 4, which is described in U.S. patent application Ser. Nos. 13/629,613, 13/730,958, and 13/889,049.

CVT1 (FIGS. 1 to 4)

A CVT 1, which is shown in FIGS. 1 to 4, comprises of a cone with two opposite teeth, labeled as cone with two opposite teeth 1A, mounted on one shaft/spline that is coupled to another cone with two opposite teeth, labeled as cone with two opposite teeth 1B, mounted on another shaft/spline by a transmission belt 2. If desired, a CVT 1 can also be constructed using two "cone with two opposite torque transmitting members" or two "cone with two opposite slide-able teeth" instead of two "cone with two opposite teeth".

The transmission ratio of a CVT 1 can be changed by changing the axial position of the cones relative to the transmission belt, which is achieved by changing the axial position of the cones and holding fixed the axial position of the transmission belt; or if desired the transmission ratio can also be changed by changing the axial position of the transmission belt and holding fixed the axial position of the cones.

It is recommended that the transmission ratio of a CVT 1 is only changed when both cones of the CVT are in a moveable position. A moveable position of a cone is a position where only one tooth/torque transmitting member of that cone is engaged with its transmission belt for torque transmission. Changing the transmission ratio when both cones are in a moveable position can avoid significant stretching of the transmission belt (if toothed torque transmission is used as is the case for the CVT 1 shown in FIGS. 1 to 4) and wear and energy loses (if friction torque transmission is used).

A CVT 1 can also be constructed using two "cone with two opposite torque transmitting members" instead of two "cone with two opposite teeth".

CVT 2 (FIGS. 5 to 8)

A CVT 2 mainly consists of two single tooth cones, labeled as single tooth cone 3A and single tooth cone 3B in FIGS. 5, 6, 7, and 8, that are mounted on one shaft/spline that are each coupled by a toothed transmission belt to a toothed transmission pulley mounted on another shaft/spline.

Each single tooth cone has one tooth that is used for torque transmission that elongates from a smaller diameter of the cone to a larger diameter of the cone. Since each single tooth cone only has one tooth, in order to ensure that at any instance during the operation of the CVT 2 at least one tooth is engaged with its transmission belt so as to ensure continual torque transmission, the tooth of single tooth cone 3A is positioned substantially opposite of the tooth of single tooth cone 3B (substantially opposite doesn't necessarily mean exactly 180 degrees apart, although exactly 180 degrees apart is preferable). So that in instances when single tooth cone 3A is positioned such that its tooth is not covered by its transmission belt, so that single tooth cone 3A is not transmitting torque; for single tooth cone 3B, its tooth is covered by its transmission belt, so that single tooth cone 3B is transmitting torque, which is due to the engagement between its tooth and its transmission belt. And in instances when single tooth cone 3B is positioned such that its tooth is not covered by its transmission belt, so that single tooth cone 3B is not transmitting torque; for single tooth cone 3A, its tooth is covered by its transmission belt, so that single tooth cone 3A is transmitting torque, which is due to the engagement between its tooth and its transmission belt. In addition, there can also exist overlapping instances where the tooth of single tooth cone 3A and the tooth of single tooth cone 3B are both engaged with their transmission belt, and hence transmit torque, at the same time.

A CVT 2 where the transmission belts are positioned near the smaller end of their single tooth cones is shown as a partial top-view in FIG. 6 and as a partial front-view in FIG. 5; and a CVT 2 where the transmission belts are positioned near the larger end of their single tooth cones is shown as a partial top-view in FIG. 8 and as a partial front-view in FIG. 7.

In the figures, the single tooth cones are labeled as single tooth cone 3A and single tooth cone 3B, the teeth of the single tooth cones are labeled as tooth 4A and tooth 4B, the transmission belts are labeled as transmission belt 5A and transmission belt 5B, the transmission pulleys are labeled as transmission pulley 6A and transmission pulley 6B, and the adjusters are labeled as adjuster 7A and adjuster 7B.

In the figures, transmission belt 5A and transmission belt 5B are not accurately drawn, hence the teeth of the transmission belts are not shown. Slightly modified silent chains or inverted teeth chains, which each have a tapered base that matches the taper of its single tooth cone instead of a level base, can be used as a transmission belt 5A and a transmission belt 5B.

In FIGS. 5 and 7, a tensioning pulley 8A, which is used to maintain the proper tension in transmission belt 5A as the transmission ratio is changed, is also shown. Although not shown, an identical tensioning pulley, positioned in the same relative position relative to its single tooth cone, also exists for transmission belt 5B. If desired, the tensioning pulleys can be replaced with idler pulleys, which move into the proper position as to maintain proper tension in their transmission belts as the transmission ratio is changed. Here sliders and slides, electronic/hydraulic positioning, etc. can be used to position the idler pulleys. More details regarding this is described in U.S. Pat. No. 7,722,490 B2.

And in FIGS. 5 and 7, a support pulley 9A for transmission belt 5A, which is used with an identical support pulley for transmission belt 5B (not shown) to ensure that at least one tooth of the single tooth cones is always engaged with its transmission belt during the operation of the CVT 2, is also shown. If the transmission ratio range of the CVT 2 is limited such that at least one tooth of the single tooth cones is always engaged with its transmission belt for all transmission ratios of the CVT 2 without the need of the support pulleys, then the support pulleys can be omitted.

The transmission ratio of the CVT 2 can be changed by changing the axial positions of the single tooth cones relative to the axial positions of their transmission belts and their transmission pulleys. In FIGS. 5, 6, 7, and 8, the single tooth cones are mounted on a spline. This allows the axial positions of the single tooth cones to be changed relative to the axial position of said spline and hence also relative to the axial positions of their transmission belts and their transmission pulleys. If desired, changing the axial positions of the single tooth cones relative to the axial positions of their transmission belts and their transmission pulleys can also be achieved by changing the axial position of the transmission belts and transmission pulleys and holding fixed the axial position of the single tooth cones.

Various guides, pulleys, or other devices that prevent/restrict axial movements of the transmission belts can be used to help maintain the axial position of the transmission belts. The need for maintaining the axial position of a transmission belt also exist in many other devices of prior art, and the methods used there can most likely also be used here, trial and error can be used to make sure; and more details regarding this is described in U.S. Pat. No. 7,722,490 B2.

In FIGS. 5, 6, 7, and 8, both transmission pulleys are mounted on their shaft through the use of an adjuster, if desired only one transmission pulley can be mounted on its shaft through the use of an adjuster. Or instead of using adjusters to mount one or both transmission pulleys to their shaft, one or both single tooth cones can be mounted on their shaft/spline through the use of an adjuster. The adjuster(s) are used to provide adjustments to eliminate/reduce transition flexing and/or adjustments to compensate for transmission ratio change rotation. If desired a CVT 2 without any adjusters can also be designed.

Regarding adjustments to eliminate/reduce transition flexing, in instances where the arc length between tooth 4A and tooth 4B for the diameter of single tooth cone 3A and single tooth cone 3B where their transmission belts are positioned is not a multiple of the width of a tooth (the width of a tooth refers to the width of tooth 4A, which should have the same width as tooth 4B), where multiple of the width of a tooth means an arc length of 1 tooth, 2 teeth, 3 teeth, and so forth, such as length 3⅓ teeth for example, then the combination of single tooth cone 3A and single tooth cone 3B resemble a sprocket where the number of teeth is not an integer so that it has a partial tooth, such as sprocket with 5¼ teeth, 7⅛ teeth, or 3⅓ teeth for example; where the partial tooth is removed and does not engage with the chain of the sprocket.

For a sprocket with a partial tooth, the tooth positioned immediately after the partial tooth will not engage properly with its chain since that tooth will either be too early or too late relative to its chain. Likewise, in instances where the arc length between tooth 4A and tooth 4B for the diameter of single tooth cone 3A and single tooth cone 3B where their transmission belts are positioned is not a multiple of the width of a tooth, then the tooth about to be engaged will not engage properly with its transmission belt and flexing of that transmission belt, referred to as transition flexing, will occur.

Transition flexing can be eliminated by adjusting the rotational position of the transmission belt that is about to be engaged relative to rotational position of the tooth with which it will engage. For example, let's say tooth 4A is positioned too late relative to its transmission belt 5A. Here in order to eliminate transition flexing, transmission belt 5A can be rotated away from tooth 4A, so that tooth 4A is positioned just right relative to its transmission belt for proper engagement to occur. Another example, let's say tooth 4A is positioned too early relative to its transmission belt 5A. Here in order to eliminate transition flexing, transmission belt 5A can be rotated towards tooth 4A, so that tooth 4A is positioned just right relative to its transmission belt for proper engagement to occur.

In order adjust the rotational position of transmission belt 5A relative to its single tooth cone 3A, and hence also relative to its tooth 4A, adjuster 7A, adjuster 7B, or both adjusters can be used (see FIGS. 6 & 8). Regarding this, since the rotational position of single tooth cone 3A relative to single tooth cone 3B is fixed, in instances where single tooth cone 3B is engaged with its transmission belt 5B, the rotational position of single tooth cone 3A, which is currently not engaged with its transmission belt 5A, depends on the rotational position of transmission belt 5B. Hence by adjusting the rotational position of the currently not engaged transmission belt 5A relative to transmission belt 5B, the rotational position of transmission belt 5A relative to single tooth cone 3A is also adjusted. And the rotational position of transmission belt 5A can be adjusted relative to transmission belt 5B by adjusting the rotational position of transmission pulley 6A relative to transmission pulley 6B using adjuster 7A, adjuster 7B, or both. In the same manner, the rotational position of transmission belt 5B relative to its single tooth cone 3B, and hence also relative to its tooth 4B, can be adjusted using adjuster 7A, adjuster 7B, or both.

Although transition flexing can be eliminated using the adjusters, if desired the transmission ratios where transition flexing occurs can be skipped.

Regarding adjustments to compensate for transmission ratio change rotation, in instances where both tooth 4A and tooth 4B are engaged with their transmission belts at the same time, the transmission ratio cannot be changed without some significant amount of stretching in the transmission belts, which is undesirable.

Here depending on the rotational position of a tooth of a single tooth cone, changing the transmission ratio when that tooth is engaged with its transmission belt applies a force that tends to rotate the single tooth cone of that tooth clockwise or counter-clockwise a certain amount. And since for a CVT 2 both single tooth cones are fixed to the same shaft and the rotation due to transmission ratio change for the single tooth cones are different due to that fact that the rotational position of their tooth is different, here changing the transmission ratio when tooth 4A and tooth 4B are both engaged with their transmission belt will stretch the transmission belts.

This type of stretching of the transmission belts can be eliminated by rotating the transmission belts relative to each other accordingly using adjuster 7A, adjuster 7B, or both adjusters so as to compensate for the difference in the applied rotation due to transmission ratio change of the single tooth cones.

Here the adjusters are used to rotate the transmission pulleys relative to each other which in turn rotates the transmission belts relative to each other. If the transmission pulleys are mounted on the input shaft, then if an adjuster rotates its transmission pulley in the direction opposite of the direction of rotation of the input shaft, then the adjuster only needs to provide a releasing torque. For a releasing torque situation, torque is only needed to overcome friction; lowering a weight using a winch is another example of a releasing torque situation; while raising a weight is not. And if the transmission pulleys are mounted on the output shaft, then if an adjuster rotates its transmission pulley in the direction of rotation of the output shaft, then the adjuster also only needs to provide a releasing torque.

In order to compensate for the difference in the applied rotation due to transmission ratio change of the single tooth cones, only the adjuster that needs to provide a releasing torque needs to be activated. For example, rotating transmission belt 5A clockwise relative transmission belt 5B can be achieved either by rotating transmission pulley 6A clockwise relative to transmission pulley 6B or by rotating transmission pulley 6B counter-clockwise relative to transmission pulley 6A. Here if rotating a transmission pulley in the counter-clockwise direction requires only a releasing torque than only adjuster 7B can be activated; and if rotating transmission pulley in the clockwise direction requires only a releasing torque than only adjuster 7A can be activated. The energy required for a releasing torque is insignificant; hence the adjusters will likely consume less energy than a windshield wiper motor.

Here when activated, the adjuster that needs to provide a releasing torque rotates its transmission pulley faster than the speed required to compensate for the difference in the applied rotation due to transmission ratio change of the single tooth cones during transmission ratio change. Here if compensating adjustment is required, the adjuster will provide the required adjustments (the adjuster will slow down or slip if it rotates faster than the required compensating adjustment), and if compensating adjustment is not required the adjusters will simply stall or slip and slightly increase the tension in the transmission belts to an acceptable limit.

The transmission ratio can be changed when only one tooth of a single tooth cone is engaged with its transmission belt; and the adjusters can provide compensation that allows the transmission ratio to be changed when both teeth of the single tooth cones are engaged; so theoretically, through the use of the adjusters there are no instances where the transmission ratio cannot be changed.

For adjuster 7A and adjuster 7B, a small low power electric motor can be used, since the adjusters only need to overcome frictional resistance. Here an electric motor can be used to drive a worm gear that drives a spur gear that rotates the output shaft of its adjuster; so that the adjuster can lock its output shaft relative to its body when the electric motor is not activated; this is required in order to transmit torque from a "transmission pulley" to "the output shaft of its adjuster" to "the body of its adjuster" and finally to "the shaft on which the body of it adjuster is fixed". Here in order to allow for large torque transmission, double enveloping worm gear-spur gear drives, such as used in high-torque speed reducers, can be used.

In order to control the adjusters a controlling computer receives input from a rotational position sensor that monitors the rotational position of the single tooth cones shaft, a rotational position sensor that monitors the rotational position of transmission pulley 6A relative to transmission pulley 6B, and a transmission ratio sensor.

The adjustment methods to eliminate/reduce transition flexing and to compensate for transmission ratio change rotation for a CVT 2 using "cones with on one torque transmitting member each" can also be used for a CVT 2 using "cones with one single tooth each (single tooth cones)". Both a "cone with on one torque transmitting member" and a "cone with one single tooth (single tooth cone)" have only one circumferential section of their cone that is toothed, which we refer to as the "toothed section". For a CVT 2, said adjustment methods do not depend on the amount of teeth in a said "toothed section", so the adjustment methods for a CVT 2 using "cones with on one torque transmitting member each" can also be used for a CVT 2 using "cones with one single tooth each (single tooth cones)", this is certainly true for the adjustment method to eliminate/reduce transition flexing and the over adjustment method to compensate for transmission ratio change rotation. Detailed descriptions regarding said adjustment methods can be found in U.S. Pat. No. 7,722,490 B2.

If desired a CVT 2 with no adjusters can also be constructed. For this CVT 2 the transmission ratios where transition flexing occur can be skipped, the transmission ratio of the CVT can be maintained at a transmission ratio where no transition flexing occur, and/or transmission belts that are designed to allow sufficient flexing to account for transition flexing can be used.

If adjustments to compensate for transition flexing is provided by rotating one transmission pulley relative to another so as to adjust the rotational position of a transmission belt relative to its cone, then it is recommended that adjustments to compensate for transition flexing are provided in the direction of rotation that increases the tension in the tense side of said transmission belt. Here if the transmission pulleys are mounted on the input shaft then said transmission belt should be rotated in the direction of rotation of the input shaft relative to its cone, and if the transmission pulleys are mounted on the output shaft then said transmission belt should be rotated in the opposite direction of rotation of the output shaft relative to its cone.

If adjustment to compensate for transition flexing is provided in the direction of rotation that decreases the tension in the tense side of a transmission belt which rotational position is adjusted relative to its cone, then said adjustment will increase the tension in the slack side of said transmission belt. Here depending on the friction between said transmission belt and its cone, the adjustment provided might change the position of the tensioning pulley (if used instead of an idler pulley) of said transmission belt and this can decrease the accuracy and increase the response time of the adjustment provided. Here experimentation can be performed to determine whether this will significantly reduce the performance and reliability of the CVT.

A CVT 2 can also be constructed using two "cone with one torque transmitting member" instead of two "single tooth cones".

CVT 3 (FIGS. 9 to 12)

A CVT 3 mainly consists of a cone with two oppositely positioned teeth (oppositely positioned teeth doesn't mean that the teeth have to be positioned exactly 180 degrees apart, but 180 degrees apart or close to 180 degrees apart), labeled as opposite teeth cone 10 in FIGS. 9, 10, 11, and 12, that is mounted on a shaft/spline that is coupled by a toothed transmission belt to a toothed transmission pulley mounted on another shaft/spline. Each tooth of said opposite teeth cone 10 elongates from a smaller diameter of the cone to a larger diameter of the cone.

A CVT 3 where the transmission belt is positioned near the smaller end of its cone with two oppositely positioned teeth is shown as a partial top-view in FIG. 10 and as a partial front-view in FIG. 9; and a CVT 3 where the transmission belt is positioned near the larger end of its cone with two oppositely positioned teeth is shown as a partial top-view in FIG. 12 and as a partial front-view in FIG. 11.

In the figures, the teeth of opposite teeth cone 10 are labeled as tooth 11A and tooth 11B, the transmission belt is labeled as transmission belt 12, and the transmission pulley is labeled as transmission pulley 13.

In the figures, transmission belt 12 is not accurately drawn; hence the teeth of the transmission belt are not shown. Slightly modified silent chains or invert teeth chains, which each have a tapered base that matches the taper of its single tooth cone instead of a level base, can be used as transmission belt 12.

In FIGS. 11 and 9, a tensioning pulley 14, which is used to maintain the proper tension in transmission belt 12 as the transmission ratio is changed, is also shown. If desired it can be replace with an idler pulley, which moves into the proper position as the transmission ratio is changed. Here sliders and slides, electronic/hydraulic positioning, etc. can be used to position the idler pulley. More details regarding this is described in U.S. Pat. No. 7,722,490 B2.

And in FIGS. 9 and 11, a support pulley 15 for transmission belt 12 that is used to ensure that at least one tooth of opposite teeth cone 10 is always engaged with transmission belt 12 during the operation of the CVT 3, is also shown. If the transmission ratio range of the CVT 3 is limited such that at least one tooth of opposite teeth cone 10 is always engaged with transmission belt 12 for all transmission ratios of the CVT 3 without the need of the support pulleys, then the support pulleys can be omitted.

In FIGS. 9, 10, 11, and 12, opposite teeth cone 10 is mounted on a spline. This allows the axial position of opposite teeth cone 10 to be changed relative to the axial position of said spline and hence also relative to the axial positions of its transmission belt and its transmission pulley. And the transmission ratio of the CVT 3 can be changed by changing the axial position of the opposite teeth cone 10 relative to the axial positions of its transmission belt and its transmission pulley. Various guides, pulleys, or other devices that prevent/restrict axial movements of the transmission belt can be used to help maintain the axial position of the transmission belt. The need for maintaining the axial position of a transmission belt also exist in many other devices of prior art, and the methods used there can most likely also be used here, trial and error can be used to make sure; and more details regarding this is described in U.S. Pat. No. 7,722,490 B2.

The CVT 3 shown in FIGS. 9, 10, 11, and 12 does not use an adjuster, hence no adjustments to eliminate/reduce transition flexing can be provided. Therefore for the CVT 3 shown in FIGS. 9, 10, 11, and 12, the transmission ratios where transition flexing occur can be skipped, the transmission ratio of the CVT can be maintained at a transmission ratio where no transition flexing occur, and/or a transmission belt that is designed to allow sufficient flexing to account for transition flexing can be used.

If desired a CVT 3 that uses a "cone with one fixed tooth and one oppositely positioned adjustable tooth" can be used instead of a "cone with two oppositely positioned fixed teeth". For a "cone with one fixed tooth and one oppositely positioned adjustable tooth", the "adjustable tooth" can be coupled to an adjuster as is done for an "adjustable torque transmitting member" of a "cone assembly with one fixed torque transmitting member and one oppositely positioned adjustable torque transmitting member" described in U.S. Pat. No. 7,722,490 B2.

The adjustment method to eliminate/reduce transition flexing for a "cone with one fixed tooth and one oppositely positioned adjustable tooth" is identical to the adjustment methods to eliminate/reduce transition flexing for a "cone assembly with one fixed torque transmitting member and one oppositely positioned adjustable torque transmitting member". Both a "cone assembly with one fixed torque transmitting member and one oppositely positioned adjustable torque transmitting member" and a "cone with one fixed tooth and one oppositely positioned adjustable tooth" have two oppositely positioned circumferential section on their cone that are toothed, which we refer to as a "toothed section" (oppositely positioned "toothed sections" doesn't mean that the "toothed sections" have to be positioned exactly 180 degrees apart, but 180 degrees apart or close to 180 degrees apart; if one "toothed section" is adjusted relative to the other "toothed section", then there should be instances where the "toothed sections" are not positioned exactly 180 degrees apart). Said adjustment method do not depend on the amount of teeth in a said "toothed section", so the adjustment method to eliminate/reduce transition flexing for a "cone with one fixed tooth and one oppositely positioned adjustable tooth" is identical to the adjustment method to eliminate/reduce transition flexing for a "cone assembly with one fixed torque transmitting member and one oppositely positioned adjustable torque transmitting member".

The adjustment methods to eliminate/reduce transition flexing for a "cone assembly with one fixed torque transmitting member and one oppositely positioned adjustable torque transmitting member" is described in U.S. Pat. No. 7,722,490 B2 for a cone assembly of a CVT 1.1, which is also applicable for a cone assembly of a CVT 3 that has a cone/cone assembly with on fixed and one oppositely positioned adjustable "toothed section".

Also for the adjustment method to eliminate/reduce transition flexing, the adjustments provided to the adjustable "toothed section" is very little. So that after a said adjustment is provided from a relative rotational position where the "toothed sections (teeth or torque transmitting members)" are exactly or almost exactly opposite, the "toothed sections" are still substantially oppositely positioned. In order to ensure that the "toothed sections" are always substantially oppositely positioned, it is recommended that the "toothed sections" are returned to the relative rotational position where the "toothed sections" are exactly or almost exactly opposite positioned every time after a said adjustment has been provided, so that every time before a said adjustment is provided, the "toothed sections" are exactly or almost exactly opposite positioned.

The operation of the mover adjusters in order to substantially increase the duration at which the transmission ratio can be changed for a cone assembly of a CVT 1.1 described in U.S. Pat. No. 7,722,490 B2 can also be used for a cone/cone assembly of a CVT 3.

A CVT 3 can also be constructed using a "cone with two opposite torque transmitting members" instead of a "cone with two opposite teeth".

In order to move the cones or the transmission belt of a CVT 1, CVT 2, CVT 3, CVT 4, or any other similar CVT, any Linear Positioning Mechanism can be used. An example of a commercially available Linear Positioning Mechanism is a Screw Driven Linear Slide that is powered by a screw that is rotated by an electric servo/stepper motor.

Here if toothed torque transmission is used, then the axial position of a cone has to be changed during a certain amount of rotation of said cone. As such, the maximum rpm speed of a CVT is limited by the maximum speed of the mechanism used to change the axial position of its cone(s).

The Linear Positioning Mechanisms of this disclosure use pre-tensioned spring as the moving force, this should allow them to move an object faster than reasonably priced Linear Positioning Mechanisms powered by electric motor(s). As such the mechanisms of this disclosure can allow for the construction of more practical and economical toothed CVT's that can operate at high rpm; and hence also increase the chance for said CVT's to succeed commercially.

BRIEF SUMMARY OF THE INVENTION

Pneumatic/hydraulic assisted mechanisms that can be used to move an object of considerable weight in quick and accurate steps. Said mechanisms can be used to move a cone of a continuous variable transmission in quick and accurate steps.

Said mechanisms can allow for the construction of a CVT that replaces automatic and manual transmissions as the transmission of choice in automobiles. Since a CVT can provide more gear ratios than manual and automatic transmissions, this will result in better performance and fuel efficiency of automobiles. This is a solution that is long felt needed and has been often attempted without success.

BRIEF DESCRIPTION OF THE SEVERAL VIEWS OF THE DRAWING

FIGS. 17A and 17B show a partial side-view of a "mover sliding plate mechanism".
FIG. 18 shows a partial end-view of a "mover sliding plate mechanism".
FIG. 19 shows a partial top-view of a "mover sliding plate mechanism".
FIG. 20 shows as a side-view of a mover rod 33.
FIG. 21 shows as a top-view of a mover rod 33.
FIG. 22 shows as a front-view of a mover rod 33.
FIG. 23 shows a partial side-view of a "straight rotation to linear converting mover mechanism".
FIG. 24 shows a top-view of a "straight rotation to linear converting mover mechanism".
FIG. 25 shows a side-view of a mover rod 33 to which a gear rack 40 is attached.
FIG. 26 shows a top-view of a mover rod 33 to which a gear rack 40 is attached.

FIG. 33 shows a top-view of a "straight rotation to linear converting mover mechanism" to which an index bar 53 is attached; also shown is output shaft 22-M1 of a partially shown "Lever Indexing Mechanism 2".

FIG. 34 shows a sectional-view of a "straight rotation to linear converting mover mechanism" to which an index bar 53 is attached, also shown are lock 18, locking-unlocking solenoid 17, and spring 17-M1.

FIG. 41 shows a partial front-view "Lever Indexing Mechanism 2" that uses an actuator lever 21A.

FIG. 42 shows a partial side-view "Lever Indexing Mechanism 2" that uses an actuator lever 21A.

FIG. 44 shows a side-view of the "Straight Rotation to Linear Converting Mover Mechanism" design used for the CVT shown in FIG. 43.

FIG. 45 shows a top-view of the "Straight Rotation to Linear Converting Mover Mechanism" design used for the CVT shown in FIG. 43.

REFERENCE NUMERALS IN DRAWINGS

Figure 2:
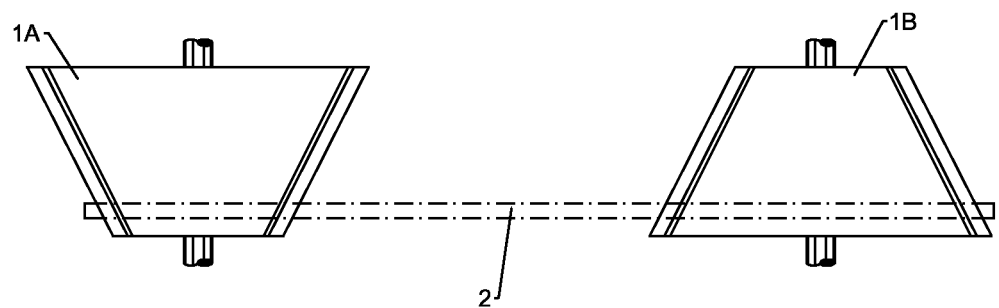
FIG. 2 shows a partial top-view of CVT 1.
Figure 1:
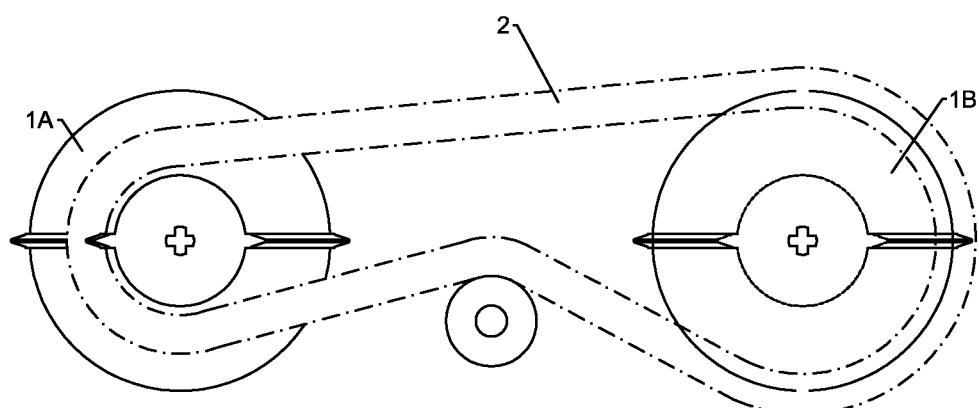
FIG. 1 shows a front-view of CVT 1.
Figure 4:
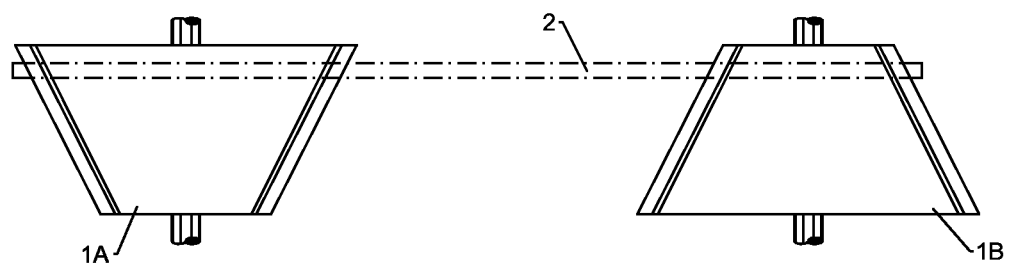
FIG. 4 shows another partial top-view of CVT 1.
Figure 3:
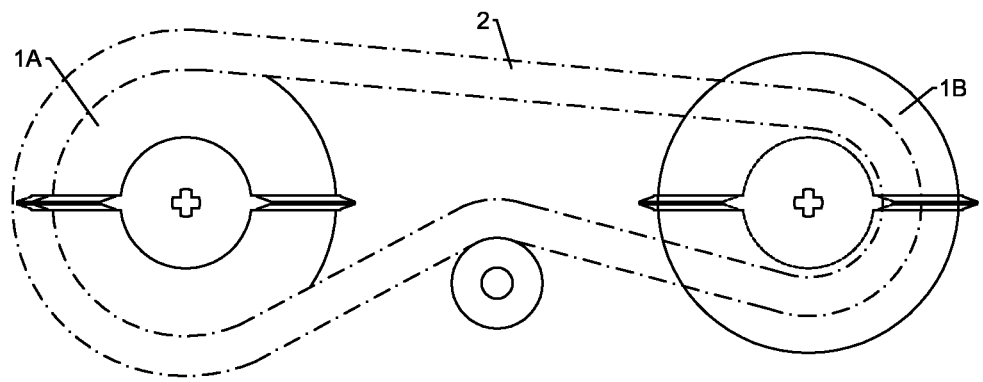
FIG. 3 shows another front-view of CVT 1.
Figure 6:
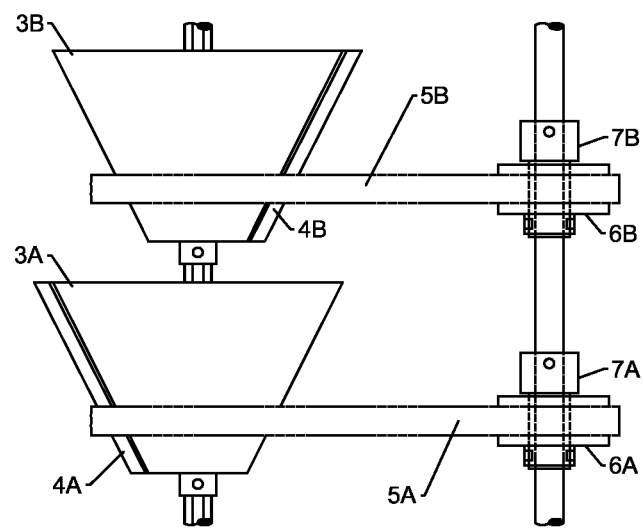
FIG. 6 shows a partial top-view of CVT 2 where the transmission belts are positioned near the smaller end of their single tooth cones.
Figure 5:
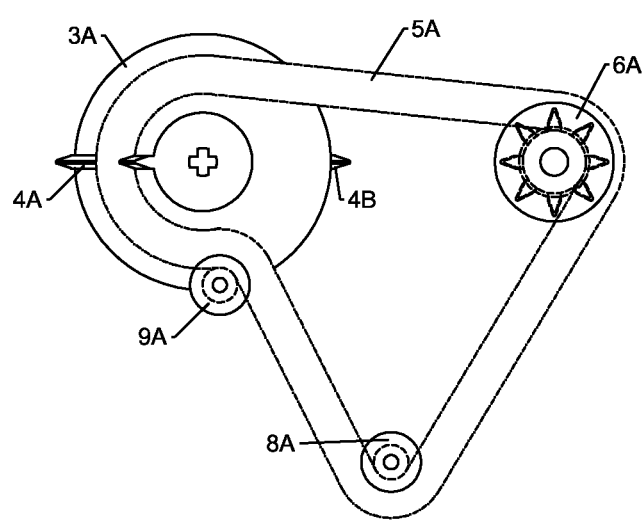
FIG. 5 shows a partial front-view of CVT 2 where the transmission belts are positioned near the smaller end of their single tooth cones.
Figure 8:
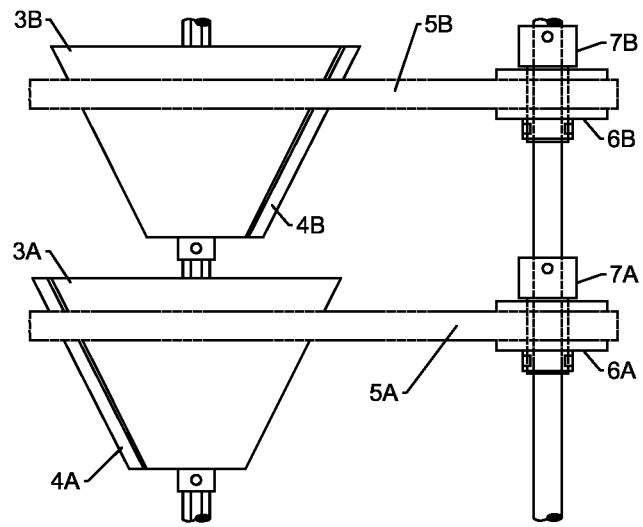
FIG. 8 shows a partial top-view of CVT 2 where the transmission belts are positioned near the larger end of their single tooth cones.
Figure 7:
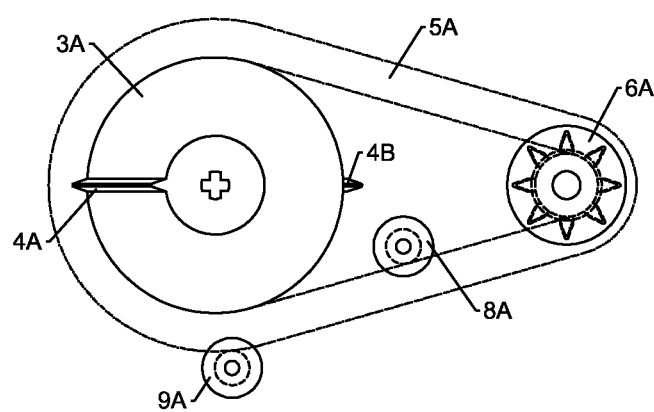
FIG. 7 shows a partial front-view of CVT 2 where the transmission belts are positioned near the larger end of their single tooth cones.
Figure 10:
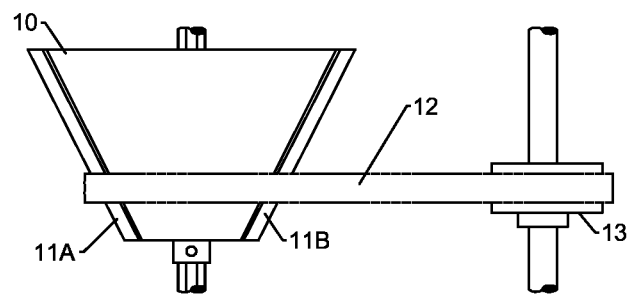
FIG. 10 shows a partial top-view of CVT 3 where the transmission belt is positioned near the smaller end of its cone with two oppositely positioned teeth.
Figure 9:
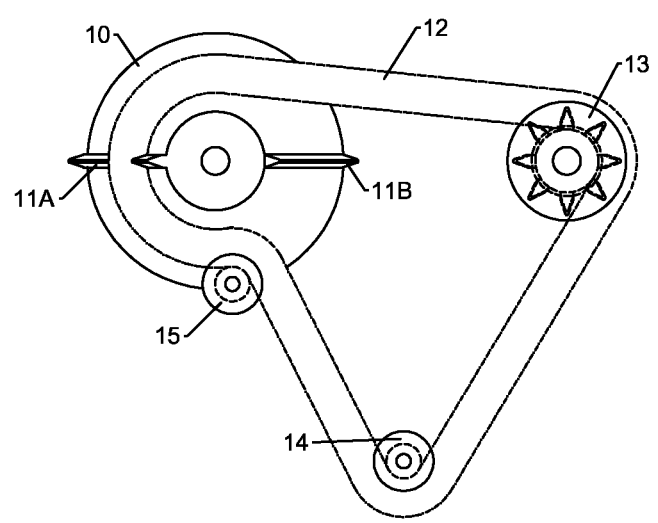
FIG. 9 shows a front-view of CVT 3 where the transmission belt is positioned near the smaller end of its cone with two oppositely positioned teeth.
Figure 12:
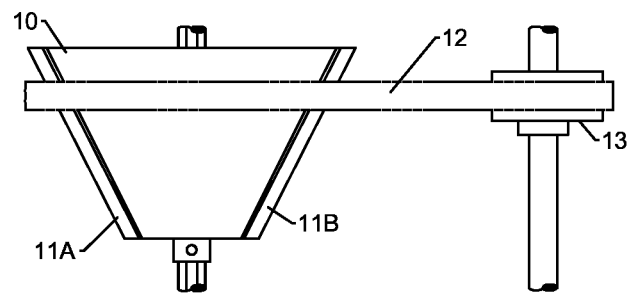
FIG. 12 shows a partial top-view of CVT 3 where the transmission belt is positioned near the larger end of its cone with two oppositely positioned teeth.
Figure 11:
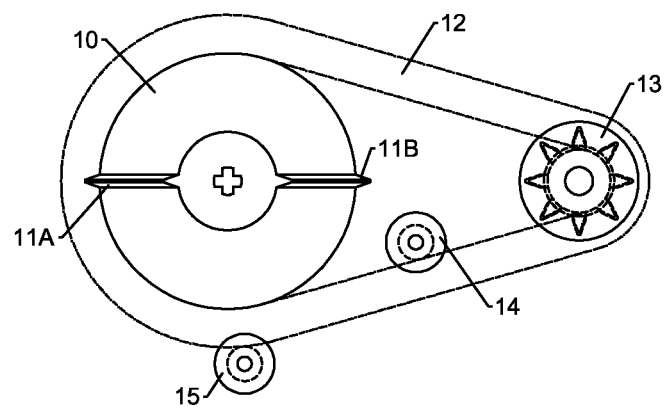
FIG. 11 shows a front-view of CVT 3 where the transmission belt is positioned near the larger end of its cone with two oppositely positioned teeth.

For the reference numerals in this disclosure, the label M# after a reference numeral, where # is a number, such as M2 for example, is used to label a member of a part that is given a reference numeral. For example, member 5 of a part 8 is labeled as 8-M5.

And the label S# after a reference numeral, where # is a number, such as S2 for example, is used to label the shape of a part that is given a reference numeral. For example, shape 8 of a part 27 is labeled as 27-S8.

DETAILED DESCRIPTION OF THE INVENTION

Transmission Ratio Changing Mechanisms

Below is described a "lever indexing mechanism", a "lever indexing mechanism 2" and a "system driven indexing mechanism". These mechanisms provide quick and accurate fixed interval rotational movements that can be converted into quick and accurate fixed interval linear movements that can be used to change the axial position of a cone, transmission belt, transmission pulley, etc. of a CVT 1, CVT 2, CVT 3, CVT 4, and other CVT's where these mechanisms can be useful.

In order to convert the rotational movements of these mechanism into linear movements, the rotation of the index wheel 16 of these mechanisms can be used to rotate the gear of a gear-gear rack drive that is used for axial position changing, or to rotate the gear of the gear-gear rack drive of a "mover sliding plate mechanism", which is described later, that is used for axial position changing.

Figure 13:
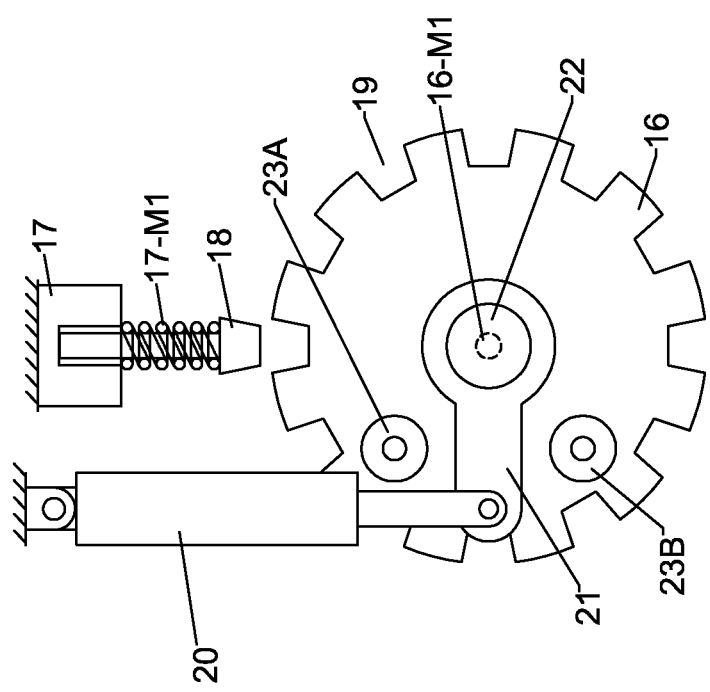
FIG. 13 shows a front-view of a Lever Indexing Mechanism.

Lever Indexing Mechanism (FIG. 13)

A lever indexing mechanism, which is shown in FIG. 13, has an index wheel 16 that can be locked and unlocked by a locking-unlocking solenoid 17. Here activating the locking-unlocking solenoid 17 will pull a lock 18 out of its cavity 19 and towards the locking-unlocking solenoid 17 so as to release the index wheel 16. And deactivating the locking-unlocking solenoid 17 will cause spring 17-M1 to push lock 18 towards its cavity 19 so as to lock the index wheel 16. Other mechanisms for locking-unlocking an index wheel can also be used, such as linear actuators, ratcheting mechanisms (if the index wheel is only released in one rotational direction), etc. Index wheel 16 has an output shaft 16-M1, which can be used to attach the item that is rotated by the lever indexing mechanism, such as a gear of a gear-gear rack drive or a screw of a rotating screw-carriage drive for example.

Here in order to rotate the index wheel 16, a linear actuator is used 20. In order to transfer the force of a linear actuator 20 to the index wheel 16 an actuator lever 21 is used. Actuator lever 21 is mounted so that it can rotate about a pivot point that is co-centric with the center of output shaft 16-M1; for such purpose actuator lever 21 can have a pivot shaft, pivot hole, etc. (not shown). Actuator lever 21 has a clutch 22 that can be used by a controller/controlling computer to controllably engage and disengage actuator lever 21 with index wheel 16. When the clutch 22 is engaged, rotation from the actuator lever 21 is transferred to index wheel 16; and when the clutch 22 is disengaged, actuator lever 21 is allowed to rotate relative to index wheel 16.

The recommended clutch to be used for clutch 22 is a jaw clutch or toothed clutch, although other clutches that can be controllably engaged and disengaged by the controller/controlling computer can also be used. A jaw clutch can comprise of two jaw gears, one fixed for rotation relative to the index wheel 16 and the other fixed for rotation relative to the actuator lever 21, that can be pushed together so as to have the clutch engaged and pushed apart so as to have the clutch disengaged. A jaw gear can be shaped like a flat washer that has at least one flat surface that is toothed. The toothed surfaces of the jaw gear of the index wheel 16 and the jaw gear of the actuator lever 21 face each other and can be made to engage and disengage through the use of a solenoid and a spring or other actuators. Here when engaged, no significant relative rotational movements between the jaw gears should occur.

The linear actuator 20 is connected to the actuator lever 21 so that it can turn the actuator lever 21 clockwise and counter-clockwise. Any type of linear actuator, such as pneumatic, hydraulic, or solenoids can be used as the linear actuator 20. If solenoids are used, then the linear actuator probably consists of two solenoids that can pull in opposite directions, unless a solenoid that can push and pull is used.

If desired, the actuator lever 21 can also be rotated using a rotary actuator (such as an electric motor for example), or other means for rotating a lever. If desired, the actuator lever 21 can also be driven by the system. For example, for a CVT 2, the actuator lever can be driven by rotation of the shaft/spline of the cones (single tooth cones). Here the rotating motion of the shaft/spline of the cones can be converted into reciprocating motion using a mechanism (many well know mechanisms that an accomplish this are known), this reciprocating motion can then be used to rotate the actuator lever clockwise and counter-clockwise as required. Here the timing of the clutch has to be accurate.

In order to avoid large shock loads, the force of the linear actuator or rotary actuator used to rotate the actuator lever 21 can be reduced when it is about to hit a stop or when it has traveled a set amount of distance; here if pneumatics or hydraulics is used as the linear actuator 20, then a pressure relief can be used for such purpose. Or if desired, in order to avoid large shock loads the rotary actuator used to rotate the actuator lever 21 can be used to brake actuator lever 21 when it is about to hit a stop or when it has traveled a set amount of distance; here if an electric motor is used, it can be turned into an electric generator.

In order to provide the required amount of rotation, the clockwise and counter-clockwise rotation of the actuator lever 21 is limited by a stop 23A and a stop 23B, which are fixed relative to a frame and not the index wheel 16. Here it is recommended that "the amount of rotation of the actuator lever 21 as it is moved from a position where it is in contact with stop 23A to the position where it is in contact with stop 23B" and "the amount of rotation of the actuator lever 21 as it is moved from a position where it is in contact with stop 23B to the position where it is in contact with stop 23A", causes the index wheel 16 to rotate from 1 cavity 19 to the next cavity 19 or close to it; otherwise locking of the index wheel 16 will be a problem. In order to avoid large shock loads dampers such as spring dampers, friction dampers, elastomer dampers, etc., can be used at stop 23A and a stop 23B. If desired stop 23A and a stop 23B do not have to be physical stops, but instead limit switches can be used to tell the linear actuator when to stop at stop 23A and stop 23B; whether this can be accurate enough can be determined through experimentation.

The operation of a lever indexing mechanism is as follows, if clockwise rotation is required then the following steps can be used:
a) during the initial stage, the index wheel 16 is locked and the clutch 22 disengaged;
b) the linear actuator 20 rotates the actuator lever 21 to stop 23B if required;
c) the clutch 22 is engaged;
d) the index wheel 16 is unlocked by pulling lock 18 out of its cavity 19 using locking-unlocking solenoid 17;
e) the linear actuator 20 rotates the actuator lever 21 towards stop 23A;
f) the pulling/releasing force of locking-unlocking solenoid 17 on the lock 18 is stopped so that the lock 18 is pushed towards the index wheel 16 by spring 17-M1;
g) once the lock 18 can slide into the next cavity 19 of the index wheel 16, it will do so and lock the index wheel 16;
h) once the actuator lever hits stop 23A, the clutch 22 is disengaged.

And if counter-clockwise rotation is required then the following steps can be used:
a) during the initial stage, the index wheel 16 is locked and the clutch 22 disengaged;
b) the linear actuator 20 rotates the actuator lever 21 to stop 23A if required;
c) the clutch 22 is engaged;
d) the index wheel 16 is unlocked by pulling lock 18 out of its cavity 19 using locking-unlocking solenoid 17;
e) the linear actuator 20 rotates the actuator lever 21 towards stop 23B;
f) the pulling/releasing force of locking-unlocking solenoid 17 on the lock 18 is stopped so that the lock 18 is pushed towards the index wheel 16 by spring 17-M1;
g) once the lock 18 can slide into the next cavity 19 of the index wheel 16, it will do so and lock the index wheel 16;
h) once the actuator lever hits stop 23B, the clutch 22 is disengaged.

For a CVT 2 it is recommended, but not an absolute requirement, that steps a) to c) are performed when the cone/transmission belt/transmission pulley of the indexing mechanism (the cone/transmission belt/transmission pulley which axial position is changed using the indexing mechanism) is used for toothed torque transmission, and steps d) to h) are performed when the cone/transmission belt/transmission pulley of the indexing mechanism is not used for toothed torque transmission.

For a CVT 2, in order to allow for proper engagement when no rotational adjustment between the transmission pulleys or cones is provided, the rotation of the index wheel 16 from one cavity 19 to the next cavity 19, should result in an axial position change of its cone/transmission belt/transmission pulley that results from an "initial transmission diameter of its cone/or the cone of its transmission belt/transmission pulley where the torque transmitting circumference of the cone corresponds to a length for which the circumferential distance between the tooth of the cone and an imaginary tooth positioned exactly opposite of the tooth of the cone is a multiple of the width of a tooth of 'its transmission belt which is positioned at said initial transmission diameter' (such as 10 teeth, 11 teeth, 12 teeth, 20 teeth, 21 teeth, etc.)" to a "final transmission diameter where the torque transmitting circumference of the cone corresponds to a length for which the circumferential distance between the tooth of the cone and an imaginary tooth positioned exactly opposite of the tooth of the cone is also a multiple of the width of a tooth of 'its transmission belt which is positioned at said final transmission diameter'".

However, this mechanism can also be used where the rotation of the index wheel 16 from one cavity 19 to the next, does not result in an axial position change of its cone/transmission belt/transmission pulley that results from an initial transmission diameter of its cone/or the cone of its transmission belt/transmission pulley where the torque transmitting circumference of the cone corresponds to a length for which the circumferential distance between the tooth of the cone and an imaginary tooth positioned exactly opposite of the tooth of the cone is a multiple of the width of a tooth of 'its transmission belt which is positioned at said initial transmission diameter" (such as 10 teeth, 11 teeth, 12 teeth, 20 teeth, 21 teeth, etc.) to a final transmission diameter where the torque transmitting circumference of the cone corresponds to a length for which the circumferential distance between the tooth of the cone and an imaginary tooth positioned exactly opposite of the tooth of the cone is also a multiple of the width of a tooth of 'its transmission belt which is positioned at said final transmission diameter'. Also, the transmission diameter of a cone depends on the axial position of a cone relative to its transmission belt, which means the same thing as the axial position of a transmission belt relative to its cone.

For a CVT 2, if rotational adjustment between the transmission pulleys or cones is provided, then the required axial position change of the cone/transmission belt/transmission pulley of the indexing mechanism as to allow for proper engagement for a given amount of rotation of the index wheel 16 from one cavity 19 to the next, depends on the rotational adjustment provided. For example, if a half-a-tooth width of rotational adjustments is provided, then the rotation of the index wheel from one cavity to the next, should result in an axial position change of its cone/transmission belt/transmission pulley that results from an "initial transmission diameter of its cone/or the cone of its transmission belt/transmission pulley where the torque transmitting circumference of the cone corresponds to a length that is a multiple of the width of a tooth of 'its transmission belt which is positioned at said initial transmission diameter' (such as 10 teeth, 11 teeth, 12 teeth, 20 teeth, 21 teeth, etc.)" to a "final transmission diameter where the torque transmitting circumference of the cone corresponds to a length that is multiple of the width of a tooth of 'its transmission belt which is positioned at said final transmission diameter".

For a cone of CVT 1, steps a) to c) can be performed at any time, and steps d) to h) should only be performed during an axial position changing interval of the cone of the indexing mechanism, which starts when only one tooth of the cone is engaged with the transmission belt and ends when the currently not engaged tooth of the cone reengages with the transmission belt. For example, here about half a rotation of the cone of the indexing mechanism can be used to perform steps a) to c) and about half a rotation of the cone of the indexing mechanism can be used to perform steps d) to h), or about "one and a half" rotation of the cone of the indexing mechanism can be used to perform steps a) to c) and about half a rotation of the cone of the indexing mechanism can be used to perform steps d) to h), etc.

For a cone of CVT 4, steps a) to c) can be performed at any time, and it is recommended that steps d) to h) are only be performed during an axial position changing interval of the cone of the indexing mechanism, which starts when the non-torque transmitting arc of the cone starts to be not completely covered by its transmission belt and ends when the non-torque transmitting arc of the cone starts to be completely covered by its transmission belt.

In general, for a cone of any CVT, it is recommended that steps a) to c) can be performed at any time; and it is recommended that steps d) to h) are only performed during an axial position changing interval of the cone of the indexing mechanism (only performed when the cone is in a moveable position). If performing steps d) to h when the "cone is not in a moveable position", such as when a complete non-torque transmitting arc of the cone of a CVT 4 is completely covered by its transmission belt for example, will not cause any damages in the CVT, such as only causes stalling of the "lever indexing mechanism" and an acceptable increase in tension in the transmission belt of the CVT for example, then steps d) to h can be performed before the "cone is in a moveable position"; but in order to always ensure proper engagement between the teeth of the cone and the teeth of its transmission belt, steps d) to h should be completed before the cone has rotated from a "cone is in a moveable position" to a "cone is not in a moveable position". Also the steps and the order of the step can be changed/modified/rearranged as needed.

For a cone of a CVT that uses a lever indexing mechanism to drive its axial position changing mechanism, in order to allow for proper engagement after an axial position change of the cone, the rotation of the index wheel 16 from one cavity 19 to the next cavity 19 should result in an axial position change of the cone that moves the cone from "one diameter that allows for proper engagement" to "another diameter that allows for proper engagement".

Experimentations can be used to determine the required axial position change of a cone in order to allow for proper engagement. For a CVT 1 and a CVT 4 details regarding the required axial position change of a cone in order to allow for proper engagement are described in the sections of this disclosure that cover these CVT's.

For "step d) the index wheel 16 is unlocked", the pulling/releasing force on the lock should be applied long enough so that the index wheel 16 will not relock at its current rotational position but fast enough so that the index wheel 16 will not skip a cavity 19. Proper duration for keeping the solenoid for locking-unlocking an index wheel active can be obtained through trial-and-error (i.e. increasing and decreasing the duration until the right duration is found) and experimentation.

For "step g) once the lock 18 can slide into the next cavity 19 of the index wheel 16, it will do so and lock the index wheel 16", the locking of the index wheel 16 can also be used to accurately position (center) the index wheel 16 if tapered teeth for the index wheel 16 and lock 18 (as shown in FIG. 13) are used, and a sufficiently strong spring for the lock 18 is used. It is recommended that the taper of the teeth is selected such that under all operating conditions of the system where it is used, no rotational force applied on its index wheel 16 can cause any lifting movements on its lock 18.

For optimal operation, it is recommended that the clutch 22 can always perfectly engage when the actuator lever 21 is at stop 23A and stop 23B. Although not preferable, some play between the linear actuator 20 and the actuator lever 21 can be allowed so as to allow the clutch 22 to perfectly engage at stop 23A and stop 23B, since this allows the actuator lever 21 to rotate a little due to centering of the engaging teeth of clutch 22 to account for any misalignment between the teeth of clutch 22 during initial engagement. Also, it is recommended that the clutch 22 is always engaged when the index wheel 16 is released so that the actuator lever 21 can control/maintain the rotational position of the index wheel 16 so as to prevent free rotation of the index wheel 16.

An index wheel 16 does not have to be rotated by the actuator lever 21 directly. It is also possible to have an index wheel 16 rotated by an actuator lever indirectly through the use of means for conveying rotational energy, such as gears, pulleys, belts, sprockets, chains, etc. for example. For example, an index wheel 16 can be rotated by an actuator gear that is engaged and disengaged with said index wheel 16 through a clutch 22 in the same way the actuator lever 21 is engaged and disengaged with its index wheel 16 through a clutch 22. The rotation provided by the actuator gear to its index wheel 16 should be identical to the rotation provided by the actuator lever 21 to its index wheel 16 as described in earlier paragraphs; while here, the rotation of the actuator lever that is rotating the actuator gear can be different from the rotation of the actuator lever 21 described in earlier paragraphs; since here the rotation of the actuator gear also depends on the means for conveying rotational energy that is/are used to couple the actuator gear to its actuator lever.

Rotating an index wheel using a means for conveying rotational energy (gear, pulley, sprocket, etc.) that is coupled to an actuator lever mechanism (which includes the actuator lever, the tension spring(s) if used, the linear actuator, etc.), can be used as cost cutting method, since with "selecting clutches" that can selectively couple the output of an actuator lever mechanism to two or index wheels, one actuator lever mechanism can be used to rotate two or more index wheels.

The rotations of an index wheel 16 of a lever indexing mechanism can be used to rotate the gear of a gear-gear rack drive that is used to change the axial position of a part such as a cone for example. Or the rotations of an index wheel 16 of a lever indexing mechanism can be used to a drive a "driving only worm gear" that rotates a gear of a gear-gear rack drive that is used to change the axial position of a part such as a cone for example. If the index wheel 16 drives a "driving only worm gear" (so that the gear of a gear-gear rack drive used with the index wheel cannot rotate the index wheel), then the "lever indexing mechanism" can work without the index wheel locking-unlocking mechanism (lock 18, locking-unlocking solenoid 17, and spring 17-M1) and the cavities 19 of the index wheel, and hence they might be eliminated.

Figure 14:
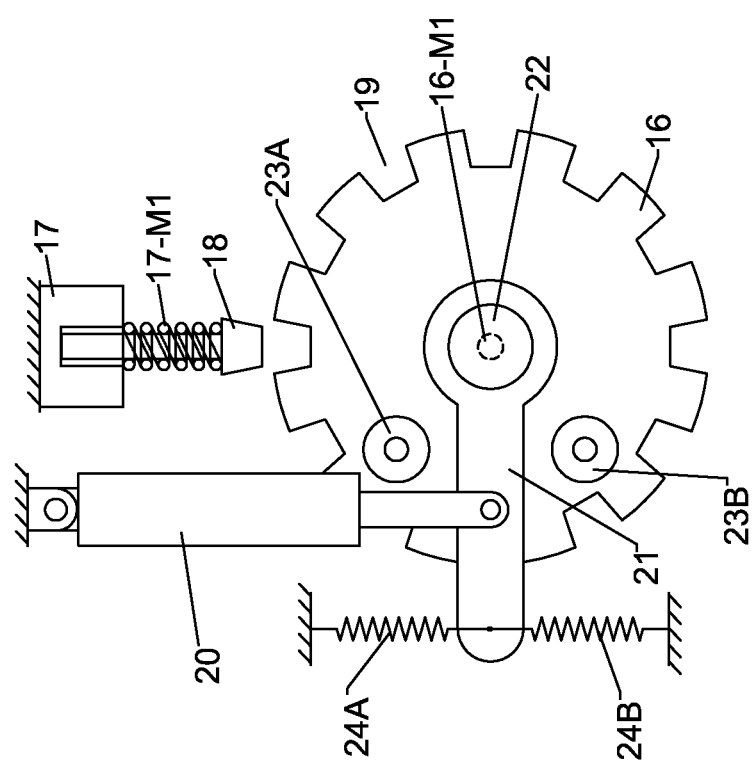
FIG. 14 shows a front-view of a Lever Indexing Mechanism for which the force on the actuator lever 21 is assisted by tension springs.

Also in order to damp and assist the force on the actuator lever 21, a spring or springs can be used. A set-up where this is used is shown in FIG. 14. In FIG. 14, two tension springs (labeled as tension spring 24A and tension spring 24B) pull the actuator lever 21 towards the mid-point between stop 23A and stop 23B. Here when the actuator lever 21 is at stop 23A or at stop 23B, a tension spring will provide assistance in pulling the actuator lever 21 towards the mid-point between stop A and stop B. And once the actuator lever 21 has moved past the mid-point between stop 23A and stop 23B, a tension spring will provide resistance to slow the actuator lever 21 down, so as to reduce the shock loads when the actuator lever 21 hits stop 23A or stop 23B.

Figure 15:
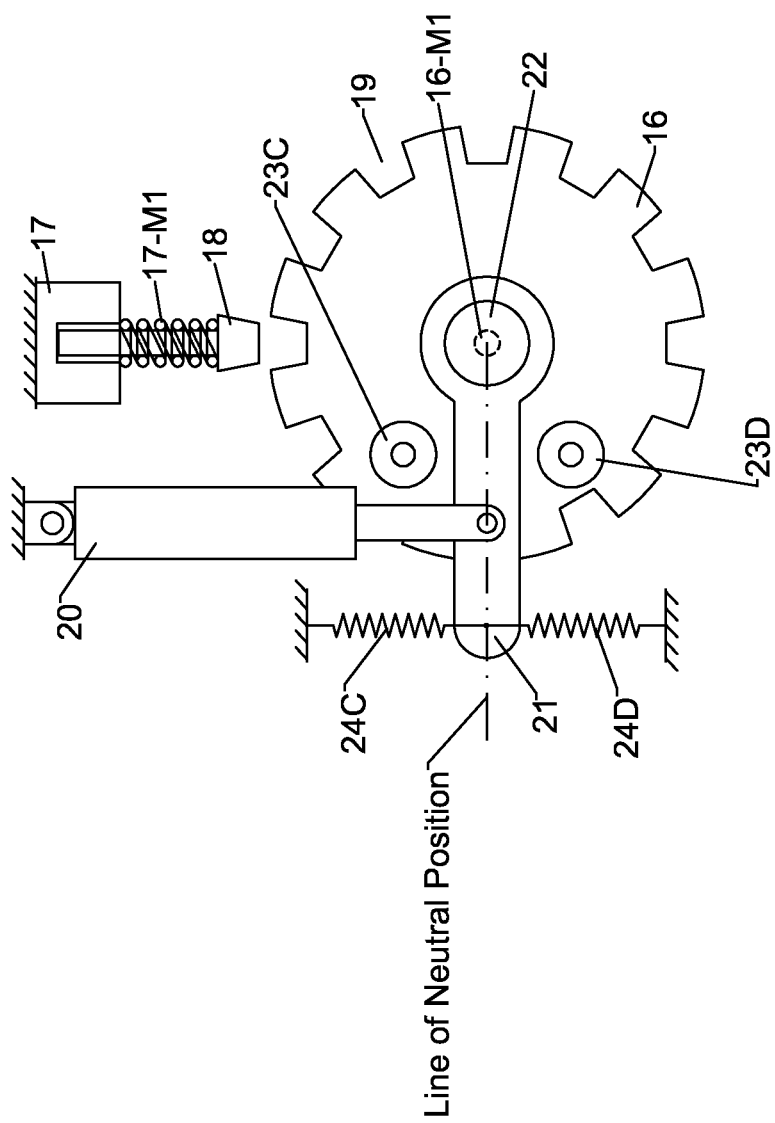
FIG. 15 shows a front-view of a Lever Indexing Mechanism 2.

Lever Indexing Mechanism 2 (FIG. 15)

A "lever indexing mechanism 2" is basically the same as a "lever indexing mechanism" that uses tension springs (see FIG. 14) except that for a "lever indexing mechanism 2", the movement of the actuator lever 21 to rotate the index wheel 16 is from a stop 23C or a stop 23D to the neutral position, instead from stop 23A to stop 23B or from stop 23B to stop 23A as it is for a "lever indexing mechanism" that uses tension springs.

A "lever indexing mechanism 2", which is shown in FIG. 15, has an index wheel 16 that can be locked and unlocked by a locking-unlocking solenoid 17. Here activating the locking-unlocking solenoid 17 will pull a lock 18 out of its cavity 19 and towards the locking-unlocking solenoid 17 so as to release the index wheel 16. And deactivating the locking-unlocking solenoid 17 will cause spring 17-M1 to push lock 18 towards its cavity 19 so as to lock the index wheel 16. Other mechanisms for locking-unlocking an index wheel can also be used, such as linear actuators, ratcheting mechanisms (if the index wheel is only released in one rotational direction), etc. Index wheel 16 has an output shaft 16-M1, which can be used to attach the item that is rotated by the lever indexing mechanism 2, such as a gear of a gear-gear rack drive or a screw of a rotating screw-carriage drive for example.

Here in order to rotate the index wheel 16, a linear actuator is used 20. In order to transfer the force of a linear actuator 20 to the index wheel 16 an actuator lever 21 is used. Actuator lever 21 is mounted so that it can rotate about a pivot point that is co-centric with the center of output shaft 16-M1; for such purpose actuator lever 21 can have a pivot shaft, pivot hole, etc. (not shown). Actuator lever 21 has a clutch 22 that can be used by a controller/controlling computer to controllably engage and disengage actuator lever 21 with index wheel 16. When clutch 22 is engaged, rotation from the actuator lever 21 is transferred to index wheel 16; and when the clutch 22 is disengaged, actuator lever 21 is allowed to rotate relative to index wheel 16.

The recommended clutch to be used for clutch 22 is a jaw clutch or toothed clutch, although other clutches that can be controllably engaged and disengaged by the controller/controlling computer can also be used. A jaw clutch can comprise of two jaw gears, one fixed for rotation relative to the index wheel 16 and the other fixed for rotation relative to the actuator lever 21, that can be pushed together so as to have the clutch engaged and pushed apart so as to have the clutch disengaged. A jaw gear can be shaped like a flat washer that has at least one flat surface that is toothed. The toothed surfaces of the jaw gear of the index wheel 16 and the jaw gear of the actuator lever 21 face each other and can be made to engage and disengage through the use of a solenoid and a spring or other actuators. Here when engaged, no significant relative rotational movements between the jaw gears should occur.

The linear actuator 20 is connected to the actuator lever 21 so that it can turn the actuator lever 21 clockwise and counter-clockwise. Any type of linear actuator, such as pneumatic, hydraulic, or solenoids can be used as the linear actuator 20. If solenoids are used, then the linear actuator probably consists of two solenoids that can pull in opposite directions, unless a solenoid that can push and pull is used.

If desired, the actuator lever 21 can also be rotated using a rotary actuator, or other means for rotating a lever. If desired, the actuator lever 21 can also be driven by the system. For example, for a CVT, the actuator lever can be driven by rotation of the input shaft/spline or output shaft/spline of the CVT. Here the rotating motion of the shaft/spline of the CVT can be converted into reciprocating motion using a mechanism (many well know mechanisms that an accomplish this are known), this reciprocating motion can then be used to rotate the actuator lever clockwise and counter-clockwise as required. Here the timing of the clutch has to be accurate.

In order to avoid large shock loads, the force of the linear actuator or rotary actuator used to rotate the actuator lever 21 can be reduced when it is about to hit a stop or when it has traveled a set amount of distance. Here if pneumatics or hydraulics is used as the linear actuator 20, then a pressure relief can be used for such purpose.

In order to provide the required amount of rotation, the clockwise and counter-clockwise rotations of the actuator lever 21 are limited by a stop 23C and a stop 23D, which are fixed relative to the frame of the lever indexing mechanism 2 and not the index wheel 16. Here rotating the actuator lever 21 from a position where it is in contact with stop 23C to the neutral position, which is the mid-point position between stop 23C and stop 23D, causes the index wheel 16 to rotate from one cavity 19 to the next cavity 19 (cause the index wheel 16 to rotate a one cavity step rotation which is a rotation that rotates a cavity 19 adjacent to the cavity 19 under the lock 18 to the cavity 19 under the lock 18 position); and here rotating the actuator lever 21 from a position where it is in contact with stop 23D to the neutral position also causes the index wheel 16 to rotate from one cavity 19 to the next cavity 19. In order to avoid large shock loads dampers such as spring dampers, friction dampers, elastomeric dampers, etc., can be used at stop 23C and a stop 23D. If desired stop 23C and a stop 23D do not have to be physical stops, but instead limit switches can be used to tell the linear actuator 20 when to stop at stop 23C and stop 23D; whether this can be accurate enough can be determined through experimentation.

In order to rotate the actuator lever 21 from stop 23C or stop 23D to the neutral position, two tension springs (labeled as tension spring 24C and tension spring 24D in FIG. 15) that pull the actuator lever 21 towards the neutral position are used. When the actuator lever 21 is at the neutral position, the pulling force of the tension springs are equal and cancel each other out, or they are zero. Here when the actuator lever is at stop 23C or at stop 23D, a tension spring (tension spring 24C or tension spring 24D) will pull the actuator lever 21 towards the neutral position. And when the linear actuator 20 moves the actuator lever 21 towards stop 23C or stop 23D, a tension spring will slow the actuator lever 21 down, so as to reduce the shock load when the actuator lever 21 hits stop 24C or stop 24D.

It is recommended that when at the neutral position, the tension springs are under tension so that they have enough pulling force to overcome the "forces needed to move the item that uses the lever indexing mechanism 2 for movement" when moving the actuator lever 21 to the neutral position or sufficiently close to the neutral position (locking of the index wheel 16 can also provide some rotational movements); although, momentum can also be used to move the actuator lever 21 to the neutral position or sufficiently close to the neutral position if the pulling force of a tension spring alone is not large enough to pull the actuator lever 21 to the neutral position or sufficiently close to the neutral position when its needs to overcome the "forces needed to move the item that uses the lever indexing mechanism 2 for movement".

Also each tension spring can be replaced with multiple tension springs if desired. The tension springs (extension springs) can also be replaced or supplemented by other springs, such as compression springs, torsion springs, etc. If size is an issue, the tension springs can be positioned lengthwise relative to their CVT; and bevel gears, shafts, etc., can be used to transfer the rotation of the index wheel 16 to the required location at the required orientation.

The operation of a "lever indexing mechanism 2" is as follows, if clockwise rotation is required then the following steps can be used:
a) during the initial stage, the index wheel 16 is locked and the clutch 22 disengaged;
b) the linear actuator 20 rotates the actuator lever 21 to stop 23D if required, so as to pre-tension tension spring 24C;
c) the clutch 22 is engaged;
d) the index wheel 16 is unlocked;
e) all forces of the linear actuator 20 are released so that the linear actuator 20 will not prevent tension spring 24C from rotating the actuator lever 21 to the neutral position. If solenoids are used, then the solenoids can simply be deactivated. If pneumatics (preferred) or hydraulics are used for the linear actuator 20, then a vent valve that vents all the pressure in the pressurized chamber of linear actuator 20 can be used. Here it also recommended that there is no significant vacuum pressure in the chamber of the pneumatic or hydraulic linear actuator that expands as the forces of the pneumatic or hydraulic linear actuator are released; this can be ensured through the use of a vacuum prevention valve that can be controllably opened and closed so as to expose the chamber of the pneumatic or hydraulic linear actuator that "expands as the forces of the pneumatic or hydraulic linear actuator are released" to atmospheric pressure.
f) the pulling/releasing force of locking-unlocking solenoid 17 on the lock 18 is stopped so that the lock 18 is pushed towards the index wheel 16 by spring 17-M1;
g) once the lock 18 can slide into the next cavity 19 of the index wheel 16, it will do so and lock the index wheel 16;
h) once the index wheel 16 is locked or once the lock 18 has started to slide into the next cavity 19 of the index wheel 16, the clutch 22 can be disengaged.

And if counter-clockwise rotation is required then the following steps can be used:
a) during the initial stage, the index wheel 16 is locked and the clutch 22 disengaged;
b) the linear actuator 20 rotates the actuator lever 21 to stop 23C if required, so as to pre-tension tension spring 24D;
c) the clutch 22 is engaged;
d) the index wheel 16 is unlocked;
e) all forces of the linear actuator 20 are released so that the linear actuator 20 will not prevent tension spring 24D from rotating the actuator lever 21 to the neutral position. If solenoids are used, then the solenoids can simply be deactivated. If pneumatics (preferred) or hydraulics are used for the linear actuator 20, then a vent valve that vents all the pressure in the pressurized chamber of linear actuator 20 can be used. Here it also recommended that there is no significant vacuum pressure in the chamber of the pneumatic or hydraulic linear actuator that expands as the forces of the pneumatic or hydraulic linear actuator are released; this can be ensured through the use of a vacuum prevention valve that can be controllably opened and closed so as to expose the chamber of the pneumatic or hydraulic linear actuator that "expands as the forces of the pneumatic or hydraulic linear actuator are released" to atmospheric pressure.
f) the pulling/releasing force of locking-unlocking solenoid 17 on the lock 18 is stopped so that the lock 18 is pushed towards the index wheel 16 by spring 17-M1;
g) once the lock 18 can slide into the next cavity 19 of the index wheel 16, it will do so and lock the index wheel 16;
h) once the index wheel 16 is locked or once the lock 18 has started to slide into the next cavity 19 of the index wheel 16, the clutch 22 can be disengaged.

For a CVT 2 it is recommended, but not an absolute requirement, that steps a) to c) are performed when the cone/transmission belt/transmission pulley of the "indexing mechanism 2" (the cone/transmission belt/transmission pulley which axial position is changed using the "indexing mechanism 2") is used for toothed torque transmission, and steps d) to h) are performed when the cone/transmission belt/transmission pulley of the indexing mechanism 2 is not used for toothed torque transmission.

For a CVT 2, in order to allow for proper engagement when no rotational adjustment between the transmission pulleys or cones is provided, the rotation of the index wheel 16 from one cavity 19 to the next cavity 19, should result in an axial position change of its cone/transmission belt/transmission pulley that results from an "initial transmission diameter of its cone/or the cone of its transmission belt/transmission pulley where the torque transmitting circumference of the cone corresponds to a length for which the circumferential distance between the tooth of the cone and an imaginary tooth positioned exactly opposite of the tooth of the cone is a multiple of the width of a tooth of 'its transmission belt which is positioned at said initial transmission diameter' (such as 10 teeth, 11 teeth, 12 teeth, 20 teeth, 21 teeth, etc.)" to a "final transmission diameter where the torque transmitting circumference of the cone corresponds to a length for which the circumferential distance between the tooth of the cone and an imaginary tooth positioned exactly opposite of the tooth of the cone is also a multiple of the width of a tooth of 'its transmission belt which is positioned at said final transmission diameter'".

However, this mechanism can also be used where the rotation of the index wheel 16 from one cavity 19 to the next, does not result in an axial position change of its cone/transmission belt/transmission pulley that results from an initial transmission diameter of its cone/or the cone of its transmission belt/transmission pulley where the torque transmitting circumference of the cone corresponds to a length for which the circumferential distance between the tooth of the cone and an imaginary tooth positioned exactly opposite of the tooth of the cone is a multiple of the width of a tooth of 'its transmission belt which is positioned at said initial transmission diameter" (such as 10 teeth, 11 teeth, 12 teeth, 20 teeth, 21 teeth, etc.) to a final transmission diameter where the torque transmitting circumference of the cone corresponds to a length for which the circumferential distance between the tooth of the cone and an imaginary tooth positioned exactly opposite of the tooth of the cone is also a multiple of the width of a tooth of 'its transmission belt which is positioned at said final transmission diameter'. Also, the transmission diameter of a cone depends on the axial position of a cone relative to its transmission belt, which means the same thing as the axial position of a transmission belt relative to its cone.

For a CVT 2, if rotational adjustment between the transmission pulleys or cones is provided, then the required axial position change of the cone/transmission belt/transmission pulley of the indexing mechanism as to allow for proper engagement for a given amount of rotation of the index wheel 16 from one cavity 19 to the next, depends on the rotational adjustment provided. For example, if a half-a-tooth width of rotational adjustments is provided, then the rotation of the index wheel from one cavity to the next, should result in an axial position change of its cone/transmission belt/transmission pulley that results from an "initial transmission diameter of its cone/or the cone of its transmission belt/transmission pulley where the torque transmitting circumference of the cone corresponds to a length that is a multiple of the width of a tooth of 'its transmission belt which is positioned at said initial transmission diameter' (such as 10 teeth, 11 teeth, 12 teeth, 20 teeth, 21 teeth, etc.)" to a "final transmission diameter where the torque transmitting circumference of the cone corresponds to a length that is multiple of the width of a tooth of 'its transmission belt which is positioned at said final transmission diameter".

For a cone of CVT 1, steps a) to c) can be performed at any time, and steps d) to h) should only be performed during an axial position changing interval of the cone of the indexing mechanism, which starts when only one tooth of the cone is engaged with the transmission belt and ends when the currently not engaged tooth of the cone reengages with the transmission belt. For example, here about half a rotation of the cone of the indexing mechanism can be used to perform steps a) to c) and about half a rotation of the cone of the indexing mechanism can be used to perform steps d) to h), or about "one and a half" rotation of the cone of the indexing mechanism can be used to perform steps a) to c) and about half a rotation of the cone of the indexing mechanism can be used to perform steps d) to h), etc.

For a cone of CVT 4, steps a) to c) can be performed at any time, and it is recommended that steps d) to h) are only be performed during an axial position changing interval of the cone of the indexing mechanism, which starts when the non-torque transmitting arc of the cone starts to be not completely covered by its transmission belt and ends when the non-torque transmitting arc of the cone starts to be completely covered by its transmission belt.

In general, for a cone of any CVT, it is recommended that steps a) to c) can be performed at any time; and it is recommended that steps d) to h) are only performed during an axial position changing interval of the cone of the indexing mechanism (only performed when the cone is in a moveable position). If performing steps d) to h when the "cone is not in a moveable position", such as when a complete non-torque transmitting arc of the cone of a CVT 4 is completely covered by its transmission belt for example, will not cause any damages in the CVT, such as only causes stalling of the "lever indexing mechanism 2" and an acceptable increase in tension in the transmission belt of the CVT for example, then steps d) to h can be performed before the "cone is in a moveable position"; but in order to always ensure proper engagement between the teeth of the cone and the teeth of its transmission belt, steps d) to h should be completed before the cone has rotated from a "cone is in a moveable position" to a "cone is not in a moveable position".

For a cone of a CVT that uses a lever indexing mechanism to drive its axial position changing mechanism, in order to allow for proper engagement after an axial position change of the cone, the rotation of the index wheel 16 from one cavity 19 to the next cavity 19 should result in an axial position change of the cone that moves the cone from "one diameter that allows for proper engagement" to "another diameter that allows for proper engagement".

Experimentations can be used to determine the required axial position change of a cone in order to allow for proper engagement. For a CVT 1 and a CVT 4 details regarding the required axial position change of a cone in order to allow for proper engagement are described in the sections of this disclosure that cover these CVT's.

For "step d) the index wheel 16 is unlocked", the pulling/releasing force on the lock should be applied long enough so that the index wheel 16 will not relock at its current rotational position but fast enough so that the index wheel 16 will not skip a cavity 19. Proper duration for keeping the solenoid for locking-unlocking an index wheel active can be obtained through trial-and-error (i.e. increasing and decreasing the duration until the right duration is found) and experimentation.

If desired steps d) and e) can be switched. Here once the spring is tensioned and the clutch engaged, the forces in the linear actuator can be vented or partially vented so as to reduce the pressure in the pressurized chamber before the index wheel is unlocked. This will increase the speed of index wheel 16, but will also increases the force needed to unlock index wheel 16.

For "step g) once the lock 18 can slide into the next cavity 19 of the index wheel 16, it will do so and lock the index wheel 16", the locking of the index wheel 16 can also be used to accurately position (center) the index wheel 16 if tapered teeth for the index wheel 16 and lock 18 (as shown in FIG. 13) are used, and a sufficiently strong spring for the lock 18 is used. It is recommended that the taper of the teeth is selected such that under all operating conditions of the system where it is used, no rotational force applied on its index wheel 16 can cause any lifting movements on its lock 18.

For optimal operation, it is recommended that the clutch 22 can always perfectly engage when the actuator lever 21 is at stop 23A and stop 23B. Although not preferable, some play between the linear actuator 20 and the actuator lever 21 can be allowed so as to allow the clutch 22 to perfectly engage at stop 23A and stop 23B, since this allows the actuator lever 21 to rotate a little due to centering of the engaging teeth of clutch 22 to account for any misalignment between the teeth of clutch 22 during initial engagement. Also, it is recommended that the clutch 22 is always engaged when the index wheel 16 is released so that the actuator lever 21 can control/maintain the rotational position of the index wheel 16 so as to prevent free rotation of the index wheel 16.

For "step e) all forces of the linear actuator 20 are released so that the linear actuator 20 will not prevent a tension spring from rotating the actuator lever 21 to the neutral position"; if desired during "step e)", or after "step c) the clutch 22 is engaged", the linear actuator can be made to start applying a force in the direction of the pulling force of the tension spring under tension. The said force of the linear actuator should be stopped once or before the actuator lever reaches the neutral position. Here a limit switch can be used to have the controller/controlling computer know when to stop the said force of the linear actuator. The said force of the linear actuator can be used to assist the pulling force of the tension spring under tension.

In order to reduce shock loads due to the locking of the index wheel 16, when the index wheel 16 is unlocked (performed at "step d)"), it can be left unlocked for a maximum allowable duration, which can be determined through experimentation or engineering, so that the actuator lever 21 can become more stabilized at the neutral position before the index wheel 16 is locked. If the index wheel 16 is left unlocked for a maximum allowable duration, then "steps f) the pulling/releasing force on the lock 18 is stopped so that the lock 18 is pushed towards the index wheel 16" and "step g) once the lock 18 can slide into the next cavity 19 of the index wheel 16, it will do so and lock the index wheel 16" are not used in the operation of the "lever indexing mechanism 2".

Another method to reduce shock loads due to locking of the index wheel 16 is by using a pneumatic/hydraulic linear actuator 20 as an air cushion. Here when the actuator lever 21 is about to reach the neutral position, the vent of the linear actuator 20 can be reduced (i.e. a vent valve with multiple settings or multiple vent valves can be used). Wedging brakes near the neutral position, and many other methods can also be used.

If the forces of the opposite tension springs (tension spring 24C and tension spring 24D) are zero or near zero at the neutral position, then the stiffness of the opposite tension springs do not have to be equal. It is even possible to use only one tension spring (such as only tension spring 24C or only tension spring 24D), which can act as only a tension spring or both as a tension spring and as a compression spring. This can be useful as a cost cutting method, since the pulling/stiffness requirements of tension spring 24C and tension spring 24D might not be equal. For example, if used to move a cone, one tension spring is used to move a cone in the axial direction where it needs to overcome the axial force due to the tension of the transmission belt, while the other tension spring (if used) is used to move a cone in the axial direction where it is assisted by the tension of the transmission belt in moving said cone in the axial direction.

Also if desired no spring is needed to rotate the actuator lever 21 to the neutral position since the linear actuator 20 can be used to rotate the actuator lever 21 to the neutral position. Here limit switches or neutral position stops can be used to stop the actuator lever at the neutral position.

An index wheel 16 does not have to be rotated by the actuator lever 21 directly. It is also possible to have an index wheel 16 rotated by an actuator lever indirectly through the use of means for conveying rotational energy, such as gears, pulleys, belts, sprockets, chains, etc. for example. For example, an index wheel 16 can be rotated by an actuator gear that is engaged and disengaged with said index wheel 16 through a clutch 22 in the same way the actuator lever 21 is engaged and disengaged with its index wheel 16 through a clutch 22. The rotation provided by the actuator gear to its index wheel 16 should be identical to the rotation provided by the actuator lever 21 to its index wheel 16 as described in earlier paragraphs; while here, the rotation of the actuator lever that is rotating the actuator gear can be different from the rotation of the actuator lever 21 described in earlier paragraphs; since here the rotation of the actuator gear also depends on the means for conveying rotational energy that is/are used to couple the actuator gear to its actuator lever.

Rotating an index wheel using a means for conveying rotational energy (gear, pulley, sprocket, etc.) that is coupled to an actuator lever mechanism (which includes the actuator lever, the tension spring(s) if used, the linear actuator, etc.), can be used as cost cutting method, since with "selecting clutches" that can selectively couple the output of an actuator lever mechanism to two or index wheels, one actuator lever mechanism can be used to rotate two or more index wheels.

The rotations of an index wheel 16 of a lever indexing mechanism can be used to rotate the gear of a gear-gear rack drive that is used to change the axial position of a part such as a cone for example; an example of such a mechanism is described in the "Straight Rotation to Linear Converting Mover Mechanism" section of this disclosure. Or the rotations of an index wheel 16 of a lever indexing mechanism can be used to a drive a "driving only worm gear" that rotates a gear of a gear-gear rack drive that is used to change the axial position of a part such as a cone for example. If the index wheel 16 drives a "driving only worm gear" (so that the gear of a gear-gear rack drive used with the index wheel cannot rotate the index wheel), then the "lever indexing mechanism 2" can work without the index wheel locking-unlocking mechanism (lock 18, locking-unlocking solenoid 17, and spring 17-M1) and the cavities 19 of the index wheel, and hence they might be eliminated.

Figure 16:
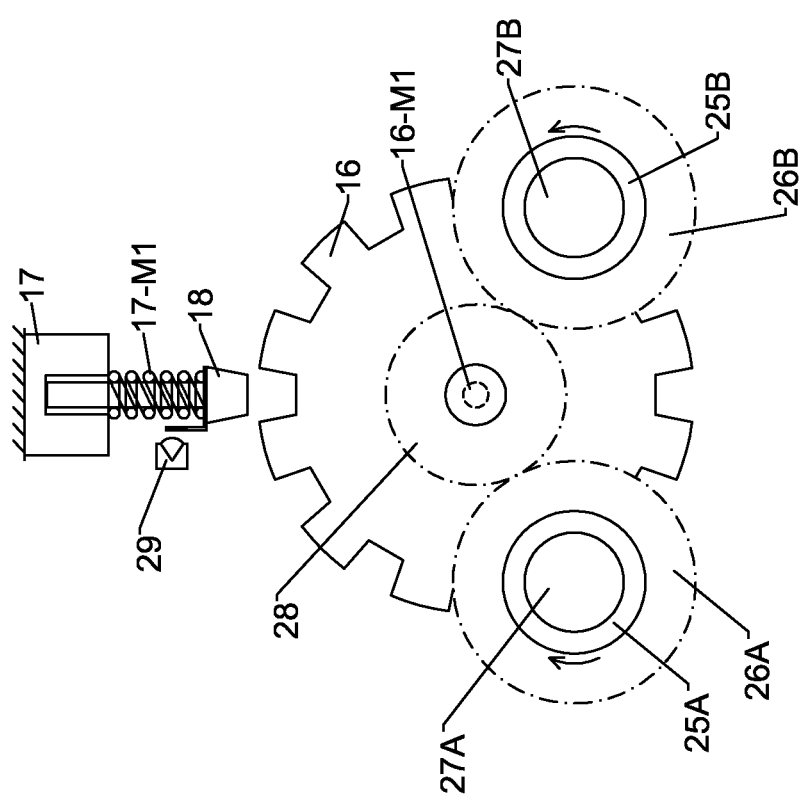
FIG. 16 shows a front-view of a System Driven Indexing Mechanism

System Driven Indexing Mechanism (FIG. 16)

Another mechanism that can be used to change the linear position of an item quickly and accurately is a "system driven indexing mechanism". For a "system driven indexing mechanism", the rotation of an index wheel is driven by the rotation of the system. For example, if a "system driven indexing mechanism" is used for a CVT 2, then its index wheel can be driven by the rotation of the shaft/spline of the cones (single tooth cones), although here the speed of the index wheel and the speed of the shaft/spline of the cones can be different due to the speed reduction or speed increase of the means for coupling (such as gears, sprocket, chains, belts, pulleys, etc.).

An example of a "system driven indexing mechanism" for a CVT is shown in FIG. 16, for this system wheel 25A and wheel 25B are driven by the rotation of the input shaft/spline of the CVT, obviously they can also be rotated by the output or other shafts/splines of the CVT. Here wheel 25A and wheel 25B are coupled to the input shaft/spline in manner such that wheel 25A rotates clockwise with the rotation of the input shaft/spline, and wheel 25B rotates counter-clockwise with the rotation of the input shaft/spline; and so that when engaged with their index wheel 16, wheel 25A and wheel 25B can provide sufficient rotation for the index wheel 16 for a given amount of rotation of to the input shaft/spline as required. Index wheel 16 has an output shaft 16-M1, which can be used to attach the item that is rotated by the lever indexing mechanism 2, such as a gear of a gear-gear rack drive or a screw of a rotating screw-carriage drive for example.

Wheel 25A is engaged with the index wheel 16 through the engagement of a gear 26A with index wheel gear 28 (gear 26A is engaged and disengaged for rotation with wheel 25A through clutch 27A, and index wheel gear 28 is fixed for rotation relative to index wheel 16). And wheel 25B is engaged with the index wheel 16 through the engagement of a gear 26B with index wheel gear 28 (gear 26B is engaged and disengaged for rotation with wheel 25B through clutch 27B, and index wheel gear 28 is fixed for rotation relative to index wheel 16).

The rotations of wheel 25A is only needed when the index wheel 16 needs to rotate counter-clockwise and the rotations of wheel 25B is only needed when the index wheel 16 needs to rotate clockwise. In order to select-ably apply the rotations of wheel 25A to the index wheel 16, a clutch 27A that can engage or disengage wheel 25A with a gear 26A through the use of a controller/controlling computer is used. And in order to select-ably apply the rotations of wheel 25B to the index wheel 16, a clutch 27B that can engage or disengage wheel 25B with a gear 26B through the use of a controller/controlling computer is used. Here when engaged, the rotations of wheel 25A is transferred to the index wheel 16 through the engagement of gear 26A with the index wheel gear 16; and when engaged, the rotations of wheel 25B is transferred to the index wheel 16 through the engagement of gear 26B with the index wheel gear 28.

In order for the controller/controlling computer to know when locking of a released index wheel 16 has started, a locking sensor 29 that senses when locking of a released index wheel 16 is about to take place is used. The locking sensor 29 can be used to signal when to deactivate any rotational position adjusting force applied to index wheel 16. A locking sensor 29 can consist of a sensor that senses any vertical movement lock 18 after its locking-unlocking solenoid 17 has been deactivated.

If counter-clockwise rotation is required then the following steps can be used:
a) during the initial stage, the index wheel 16 is locked;
b) the index wheel 16 is unlocked;
c) clutch 27A is engaged so that gear 26A rotates index wheel gear 28;
f) the pulling/releasing force of locking-unlocking solenoid 17 on the lock 18 is stopped so that the lock 18 is pushed towards the index wheel 16 by spring 17-M1;
g) once the lock 18 can slide into the next cavity of the index wheel 16, it will do so and lock the index wheel 16;
h) once locking of index wheel 16 has started (as sensed by locking sensor 29), clutch 27A is disengaged.

And if clockwise rotation is required then the following steps can be used:
a) during the initial stage, the index wheel 16 is locked;
b) the index wheel 16 is unlocked;
c) clutch 27B is engaged so that gear 26B rotates index wheel gear 28;
f) the pulling/releasing force of locking-unlocking solenoid 17 on the lock 18 is stopped so that the lock 18 is pushed towards the index wheel 16 by spring 17-M1;
g) once the lock 18 can slide into the next cavity of the index wheel 16, it will do so and lock the index wheel 16;
h) once locking of index wheel has started (as sensed by locking sensor 29), clutch 27B is disengaged For step f), the index wheel should be released long enough so that it will not relock at its current rotational position but fast enough so that it will not skip a groove. Proper duration for keeping an index wheel unlocked can be obtained through trial and error and experimentation.

The steps for operating the "system driven indexing mechanism" can be changed and rearranged. For example, step "c) clutch 27A/B is engaged so that gear 26A/B rotates index wheel gear 28" can be performed before step "b) the index wheel 16 is unlocked"; however here the wheel 25A/B has to be able to rotate relative to the input shaft/spline of the CVT that is driving it, this can be achieved through the use of friction clutch(s) or other devices that allow for relative rotation.

If wheel 25A or wheel 25B can be made to select-ably rotate clockwise and counter-clockwise (many well know mechanisms that an accomplish this are known) only either wheel 25A or wheel 25B is needed.

A "system driven indexing mechanism" can be combined with other indexing mechanism or other mechanisms in a manner so that only one wheel 25 (and its clutch and gear) that is providing rotation in only one direction is required, if the other indexing mechanism is used to provide rotation in the other direction.

The rotations of an index wheel 16 of a "system driven indexing mechanism" can be used to rotate the gear of a gear-gear rack drive that is used to change the axial position of a part such as a cone for example.

All items/descriptions of the other indexing mechanism of this disclosure are also relevant here as applicable and vice-versa.

Other Methods and Devices Related to Changing the Transmission Ratio

Mover Sliding Plate Mechanism for Converting Fixed Interval Movements to Required Interval Movement for Moving a Cone The axial position of a cone can be changed quickly and accurately using a "transmission ratio changing mechanism" described in the "Transmission Ratio Changing Mechanisms" section, preferably a "Lever Indexing Mechanism 2".

The movements provided by a "transmission ratio changing mechanism" is fixed, while the required axial movements for a cone/transmission belt/transmission pulley from one transmission diameter that allows for proper engagement to the next transmission diameter that allows for proper engagement might change with the change in transmission diameter of its cone (this is the case for single tooth cone and cone with two opposite teeth due to the location of the neutral-axis of their transmission belt). If so, in order to have a "transmission ratio changing mechanism" provide the required amount of axial movements for a cone/transmission belt/transmission pulley a "mover sliding plate mechanism", described in this section can be used.

A "mover sliding plate mechanism" that can be used to control the axial position of a cone/transmission belt/transmission pulley is shown as a partial side-view in FIGS. 17A and 17B, as a partial end-view in FIG. 18, and as a partial top-view in FIG. 19. It comprises of two parallel sliding plates 30 that can be moved in the up-&-down directions shown in FIG. 17A. The position of one sliding plate relative to the other is fixed through the use of a connector plate 31 so that the sliding plates 30 are always aligned such that the mover pins 32, which end portions slide in slot 30-S1 of a sliding plate 30, are always perpendicular to the sliding plates 30.

In FIGS. 17A, 17B, and 18, the connector plate 31 is welded to the sliding plates 30 for simplicity in describing the mechanism. Obviously here and in all other parts of this description where applicable, other methods for connecting can be used. For example, here fasteners such as bolts, nuts, locking rings, etc., can be used for ease of assembly and disassembly and to prevent warping.

A mover pin 32 is attached to each side surface a mover rod 33 near the rear end of the mover rod 33, which is shown in FIGS. 21, 22, and 23. And at the front end of the mover rod 33, a mover connector 34 is attached. A mover connector 34 has a hole through which the front end of cone 35 (sliding on a spline 41) can be slid in and secured for axial (but not rotational) movements relative to the mover connector 34 using a cone lock ring 36. A mover rod 33 and its attachments are shown as a side-view in FIG. 21, as a top-view in FIG. 22, and as a front-view in FIG. 23. If used to move other things than a cone, such as a guide plate for a transmission belt or a transmission pulley for example, a different mover connector 34 can be used for the mover rod 33.

The slots 30-S1 of the sliding plates 30 are shaped so that with proper fixed interval up-&-down movements of the sliding plates 30, a mover rod 33 can properly position the cone/transmission belt/transmission pulley attached to it so that said cone/transmission belt/transmission pulley is properly positioned as to allow for proper engagement for all transmission diameters of its cone.

FIGS. 17A and 17B might not accurately show the slots 30-S1 of the sliding plates 30. The exact shape for the slots 30-S1 of the sliding plates 30 can be obtained through experimentation. For example, for a cone with two opposite teeth, an experiment can be made by moving the axial position of the cone relative to its transmission belt from its smallest transmission diameter to its largest transmission diameter and recording for what axial positions of the cone relative to its transmission belt, the transmission belt can be wrapped around the cone from one tooth of the cone to the other tooth of the cone without stretching. The obtained axial positions, which should be used as the axial positions used for the operational transmission diameters of the cone, in addition with the fixed interval up-&-down movements provided by the "transmission ratio changing mechanism" can be used to accurately shape the slots 30-S1 of the sliding plates 30 through simple mathematics and/or experimentation.

In order to limit the movements of the mover pin 32, and hence also the movements of the mover rod 33, to horizontal movements, two parallel horizontal movement plates 37 that each has a horizontal slot are used. The horizontal movement plates 37 are aligned and fixed to a non-moving part of the CVT, such as the housing of the CVT for example, in manner such that the mover pins 32, which end portions each slide in the slot of a horizontal movement plate 37, are always horizontal.

Between the parallel sliding plates 30 and the parallel horizontal movement plates 37, the mover rod 33 is positioned (see FIGS. 18 and 19). In order for the "mover sliding plate mechanism" to be accurate, it is recommended that minimal axial movements between the mover rod 33 and the sliding plates 30 are allowed.

In order to secure the mover rod 33 to the sliding plates 30 and the horizontal movement plates 37, two locking rings 38 that sandwich the sliding plates 30 are used; here each locking ring 38 is attached near an end of a mover pin 32 of the mover rod 33. It is recommended that friction between the slots of "the sliding plates 30 and the horizontal movement plates 37" and the "mover pins 32" is minimized; and it is also recommended that friction between the "locking rings 38" and the "sliding plates 30" is minimized; this can be achieved by making or coating the sliding plates 30 and the horizontal movement plates 37 with a low friction material, or submerging the mechanism in oil. Also in the figures the locking ring grooves for the locking rings might not be shown because of time limitations, but obviously they are there. This also applies to the all other parts of this disclosure where applicable.

In order to move the sliding plates 30 in the up & down directions shown in FIG. 17A, a linear actuator which linear movements are controlled through rotational input, such as a gear-gear rack drive or rotating screw-carriage drive, can be used. Here the rotational input for the linear actuator can be provided by a "transmission ratio changing mechanism" described in the "Transmission Ratio Changing Mechanisms" section, preferably a "Lever Indexing Mechanism 2". Obviously other types of linear actuators can also be used.

In FIGS. 17A & 19, gear-gear rack drive that has a gear 39 and a gear rack 40 (which is fixed to a sliding plate 30) are used to move the sliding plates 30 in the up & down directions shown in FIG. 17A. A transmission ratio changing mechanism described in the "Transmission Ratio Changing Mechanisms" section, preferably a "Lever Indexing Mechanism 2", can be used to provide the rotational input for the gear 39. The rotational input for the gear 39 can also be provided by other means such as a stepper motor for example.

Each sliding plate 30 has two parallel vertical guides 42 (see FIGS. 17B & 19), that sandwich the side surfaces of the sliding plate 30. The vertical guides 42 are used to constrain the movements of the sliding plates 30 to the up & down directions. It is preferably to keep friction between the side surfaces of the sliding plates 30 and the constraining surfaces of the vertical guides 42 to a minimum.

The "mover sliding plate mechanism" can also be used to move a transmission pulley, transmission a belt, a guide plate of a transmission belt, a sliding plate mechanism for a compensating pulley, a compensating pulley, an engagement pulley, etc. axially. Slight adaptations might be necessary.

The "mover sliding plate mechanism" in combination with a "transmission ratio changing mechanism", such as a "lever indexing mechanism 2", can also be used to move other things that need to be moved a certain amount within a short duration. Here the slots 30-S1 of the sliding plates 30 can simply be reshaped as needed.

Straight Rotation to Linear Converting Mover Mechanism

For CVT's where fixed interval axial movements can allow for proper engagement (such as a CVT 1 using cones with two opposite torque transmitting members each, a CVT 1 using cones with one torque transmitting member each, and a CVT 4 using cones with one torque transmitting member each for example), a "mover sliding plate mechanism" might not be needed.

Here in order to move a cone/transmission belt/transmission pulley, a "straight rotation to linear converting mover mechanism", shown as a partial side-view in FIG. 23 and as a top-view in FIG. 24, can be used. A "straight rotation to linear converting mover mechanism" uses a mover rod 33 described previously to which a gear rack 40 is attached.

The mover rod 33 to which a gear rack 40 is attached is shown as a side-view in FIG. 25 and as a top-view in FIG. 26. It is identical to the mover rod 33 shown in FIGS. 20 to 22, except that a gear rack 40 is attached to it.

For the "straight rotation to linear converting mover mechanism" shown in FIGS. 23 and 24, mover rod 33 is used to move a cone with one torque transmitting member 43; and gear rack 40 is moved in a linear movement through the engagement with a rotating only gear 39.

A transmission ratio changing mechanism described in the "Transmission Ratio Changing Mechanisms" section, preferably a "Lever Indexing Mechanism 2", can be used to provide the rotational input for the gear 39. The rotational input for the gear 39 can also be provided by other means such as a stepper motor for example.

Another "Straight Rotation to Linear Converting Mechanism" is a "Rotating Screw Driven Linear Slide". Here a transmission ratio changing mechanism described in the "Transmission Ratio Changing Mechanisms" section, preferably a "Lever Indexing Mechanism 2", can be used to provide the rotational input for the rotating screw.

The "straight rotation to linear converting mover mechanism" can also be used to move a transmission pulley, transmission a belt, a guide plate of a transmission belt, a sliding plate mechanism for a compensating pulley, a compensating pulley, an engagement pulley, etc. axially. Slight adaptations might be necessary.

Figure 27:
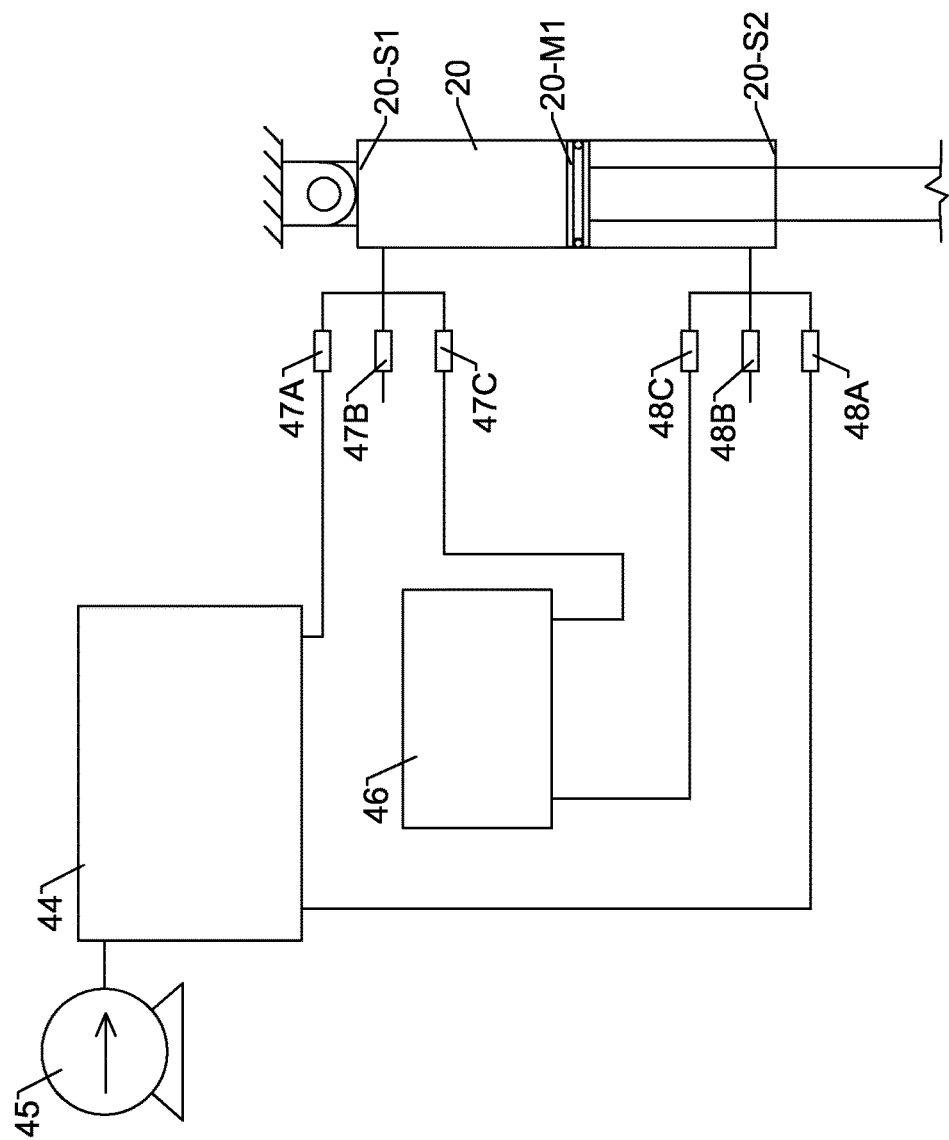
FIG. 27 shows a schematic diagram of a pneumatic Recovery System for a linear actuator 20 of a "Lever Indexing Mechanism 2".

Recovery System (FIG. 27)

Figure 28:
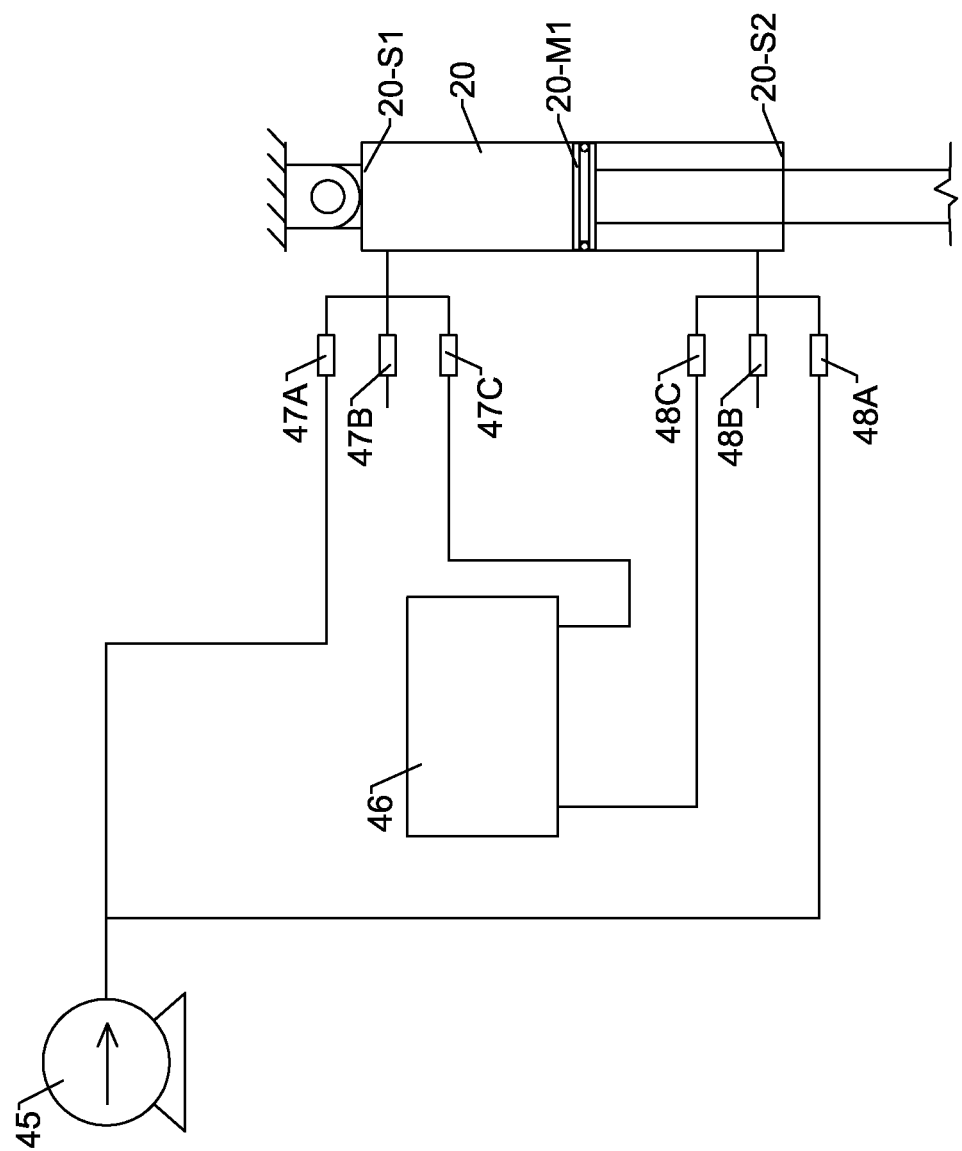
FIG. 28 shows another schematic diagram of a pneumatic Recovery System for a linear actuator 20 of a "Lever Indexing Mechanism 2".

In order to increase the efficiency of a "Lever Indexing Mechanism 2", a Recovery System can be used. An example of a Recovery System for a "Lever Indexing Mechanism 2" that uses a pneumatic linear actuator for linear actuator 20 of the "Lever Indexing Mechanism 2" is shown in FIGS. 27 and 28. The Recovery Systems shown in FIGS. 27 and 28 are identical except that the Recovery Systems shown in FIG. 27 uses a Pressure Accumulator 44 while the Recovery Systems shown in FIG. 28 does not.

Figure 29:
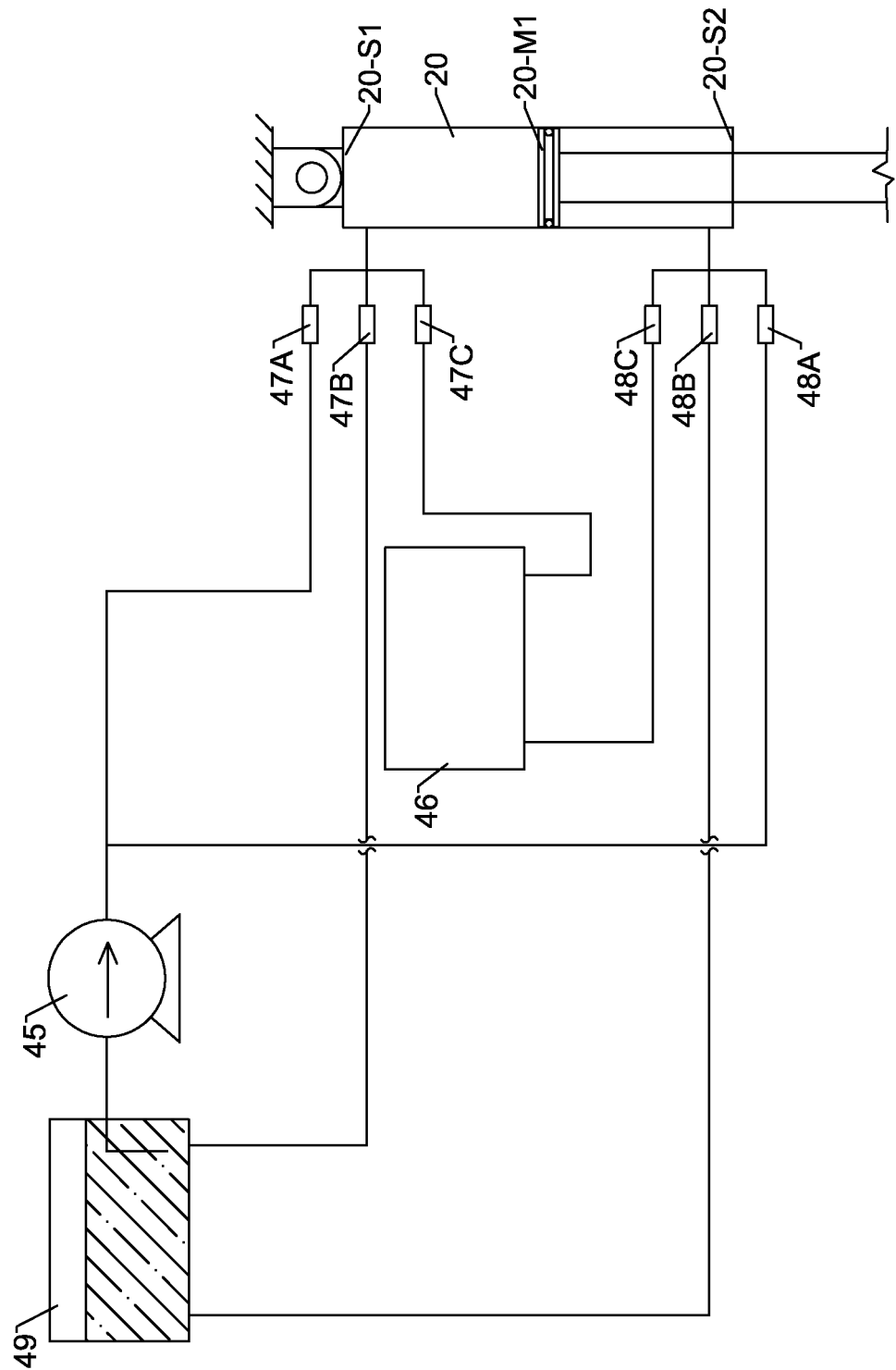
FIG. 29 shows a schematic diagram of a hydraulic Recovery System for a linear actuator 20 of a "Lever Indexing Mechanism 2".

An example of a Recovery System for a "Lever Indexing Mechanism 2" that uses a hydraulic linear actuator for linear actuator 20 is shown in FIG. 29. In FIG. 29, parts that have the same function as in the pneumatic system have the same labeling.

The "Recovery Systems" shown in FIGS. 27 to 29 comprise of a Pump 45, a Recovery Accumulator 46, a Pushing Chamber Pressure Valve 47A, a Pushing Chamber Vent/Return Valve 47B, a Pushing Chamber Recovery Valve 47C, a Pulling Chamber Pressure Valve 48A, a Pulling Chamber Vent/Return Valve 48B, and a Pulling Chamber Recovery Valve 48C. In addition, the "Recovery System" shown in FIG. 27 also has a Pressure Accumulator 44; and the "Recovery System" shown in FIG. 29 also has a Fluid Tank 49.

Pump 45 is used to supply pressurized gas (for pneumatic systems) or pressurized fluid (for hydraulic systems) to Recovery Accumulator 46, if used, or to linear actuator 20 directly, if Recovery Accumulator 46 is not used.

The Pressure Accumulator 44, if used, and Recovery Accumulator 46 are each a pneumatic or hydraulic accumulator that can store gas or fluid under pressure. In order to maintain the pressure in the accumulators, volume compressing mechanisms, such as volume reducing surfaces pushed by springs, expanding-contracting diaphragms, or gravity for example, can be used. The gas or fluid in the accumulators can be used to supply compressed gas or fluid to linear actuator 20. It is recommended, but not an absolute requirement that the pressure in Recovery Accumulator 46 is lower than the pressure in Pressure Accumulator 44, if used, and lower than the supply pressure of Pump 45.

The "main source of pressure" for Linear Actuator 20 (which is Pressure Accumulator 44 in FIG. 27, and Pump 45 in FIGS. 28 and 29) is connected to the pushing and pulling chambers of Linear Actuator 20 through piping, hoses, and/or other means connecting gas/fluid ports. Between the connection of said "main source of pressure" and the "pushing chamber of the Linear Actuator 20" a Pushing Chamber Pressure Valve 47A is positioned, and between the connection of said "main source of pressure" and the "pulling chamber of the Linear Actuator 20" a Pulling Chamber Pressure Valve 48A is positioned. The open/close position of Pushing Chamber Pressure Valve 47A and Pulling Chamber Pressure Valve 48A can be controlled by a controller.

The Recovery Accumulator 46 is connected to the pushing and pulling chambers of Linear Actuator 20 through piping, hoses, and/or other means connecting gas/fluid ports. Between the connection of Recovery Accumulator 46 and the "pushing chamber of the Linear Actuator 20" a Pushing Chamber Recovery Valve 47C is positioned, and between the connection of Recovery Accumulator 46 and the "pulling chamber of the Linear Actuator 20" a Pulling Chamber Recovery Valve 48C is positioned. The open/close position of Pushing Chamber Recovery Valve 47C and Pulling Chamber Recovery Valve 48C can be controlled by a controller.

Both the pushing and pulling chambers of Linear Actuator 20 are also connected to a vent (for pneumatic systems) or a fluid tank return (for hydraulic systems). A Pushing Chamber Vent/Return Valve 47B is used to controllably open or close the connection of the pushing chamber to the vent or fluid tank return through the use of a controller. And a Pulling Chamber Vent/Return Valve 48B is used to controllably open or close the connection of the pulling chamber to the vent or fluid tank return through the use of a controller.

The operation of a "Recovery System" during the operation of a "lever indexing mechanism 2" in providing rotation (see "Lever Indexing Mechanism 2" section), is described in the paragraphs below. The valve positioning are provided as an example and do not have to be followed exactly.

When the actuator lever 21 is at the neutral position (see FIG. 15), all valves (47A-47C & 48A-48C) of the "Recovery System" are closed, and Piston Head 20-M1 of Linear Actuator 20 is at its neutral position as approximately shown in FIGS. 27, 28, and 29.

During the rotation of actuator lever 21 to Stop 23C or Stop 23D in order to tension spring(s) 24C or spring(s) 24D (see FIG. 15), Piston Head 20-M1 is moved towards the cylinder top end 20-S1 or the cylinder bottom end 20-S2 of Linear Actuator 20. This is accomplished by pressurizing the pushing side or pulling side of Linear Actuator 20 as required.

Pressurizing the pushing side of Linear Actuator 20 can be accomplished by opening Pushing Chamber Pressure Valve 47A and Pulling Chamber Vent/Return Valve 48B; and pressurizing the pulling side of Linear Actuator 20 can be accomplished by opening Pulling Chamber Pressure Valve 48A and Pushing Chamber Vent/Return Valve 47B.

During the step of the operation of "Lever Indexing Mechanism 2" where actuator lever 21 is rotated from Stop 23C or Stop 23D towards its neutral position due to the tension of the tensioned spring(s) 24C or 24D (which here is also referred to as the "release of the tension of the tensioned spring(s)" phase), the Piston Head 20-M1 of Linear Actuator 20 is moved from a position "near/at the cylinder top end 20-S1 or near/at the cylinder bottom end 20-S2" towards its neutral position. Here for the pressurized (contracting) chamber of Linear Actuator 20, the pressure in that chamber is released (the pressure in that chamber can also be released prior to the releasing the tension of the pre-tensioned spring(s), such as when the spring(s) are already pre-tensioned and the index wheel 16 is still locked); this can be accomplished by opening the vent/return valve for that chamber, which for the pushing chamber is Pushing Chamber Vent/Return Valve 47B and for the pulling chamber is Pulling Chamber Vent/Return Valve 48B. And here for the unpressurized (expanding) chamber, the pressure in that chamber is maintained or increased. The pressure in the unpressurized (expanding) chamber can be maintained by opening the vent/return valve for that chamber. And the pressure in the unpressurized (expanding) chamber can be increased by opening the pressure valve for that chamber (which for the pushing chamber is Pushing Chamber Pressure Valve 47A and for the pulling chamber is Pulling Chamber Pressure Valve 48A), or by opening the recovery valve for that chamber (which for the pushing chamber is Pushing Chamber Recovery Valve 47C and for the pulling chamber is Pulling Chamber Recovery Valve 48C).

In order to reduce the speed of the piston of Linear Actuator 20 so as to reduce the impact speed in "Lever Indexing Mechanism 2" that occurs at the end of the "release of the tension of the tensioned spring(s)" phase, the Recovery Accumulator 46 can be used to brake the piston of Linear Actuator 20 as it nears its stopping position. Braking of the piston of Linear Actuator 20 can be accomplished by exposing the pressurized (contracting) chamber of Linear Actuator 20 to the pressure from Recovery Accumulator 46, which can be accomplished by opening the recovery accumulator valve for that chamber (which for the pushing chamber is Pushing Chamber Recovery Valve 47C and for the pulling chamber is Pulling Chamber Recovery Valve 48C), and preferably also closing the vent/return valve for that chamber. Actuation of the braking action can be based on timing, such as the amount of time that has elapsed from the start of the "release of the tension of the tensioned spring(s)" phase; or can be based on the position of the piston of Linear Actuator 20 relative to its final stopping position, here positional sensors (such as limit switches for example) can be used.

The compressed gas/fluid in Recovery Accumulator 46, if available, can be used to supply Linear Actuator 20 with pressurized gas/fluid needed to tension the spring(s) of "Lever Indexing Mechanism 2". It is recommended that the pressure in Recovery Accumulator 46 is lower than the pressure in Pressure Accumulator 44. Therefore, the compressed gas/fluid in Recovery Accumulator 46 might not be able to tension the spring(s) of "Lever Indexing Mechanism 2" to their final position. Hence here the compressed gas/fluid in Recovery Accumulator 46 can be used during the first tensioning phase of the tensioning of the spring(s) phase, and Pressure Accumulator 44 or Pump 45 can be used during the second tensioning phase of the tensioning of the spring(s) phase.

Switching between said first tensioning phase and said second tensioning phase can be based on the pressure requirement of Linear Actuator 20 and the actual or design supply pressure of Recovery Accumulator 46. The pressure requirement for Linear Actuator 20 can be determined by the extension/retraction of the piston of Linear Actuator 20 from its neutral position, since the tension in the spring(s) increase as they are stretched further. Here a "switching extension/retraction limit" (which is based on a pre-set amount of extension/retraction of the piston of Linear Actuator 20 from its neutral position) can be used to trigger an actuation signal for switching from said first tensioning phase to said second tensioning phase when said "switching extension/retraction limit" is reached. Here a limit switch can be used to indicate when the extension of the piston of Linear Actuator 20 has reached its "switching extension/retraction limit", and a limit switch can also be used to indicate when the retraction of the piston of Linear Actuator 20 has reached its "switching extension/retraction limit".

Another method to determine the pressure requirement for Linear Actuator 20 is by using a high pressure limit switch for each chamber of Linear Actuator 20. Here a high pressure limit switch can be used to indicate when the pressure in the Pushing Chamber of Linear Actuator 20 has reached its "switching pressure limit"; and another high pressure limit switch can be used to indicate when the pressure in the Pulling Chamber of Linear Actuator 20 has reached its "switching pressure limit". Here tripping of a high pressure limit switch (which occurs when a "switching pressure limit" has been reached), can be used as the actuation signal for switching from said first tensioning phase to said second tensioning phase.

Additionally switching between said first tensioning phase and said second tensioning phase should also be based on the amount of compressed gas/fluid available in Recovery Accumulator 46, since switching should start before the compressed gas/fluid in Recovery Accumulator 46 is exhausted. In order to determine if the amount of compressed gas/fluid in Recovery Accumulator 46 is exhausted or about to be exhausted, a level sensor or level switch that can determine the level of fluid or the level of the compressing surface of Recovery Accumulator 46 can be used. Alternately, instead of a level sensor or level switch any other commercially available sensor for determining the amount of gas/fluid in an accumulator can be used.

If desired a low pressure switch, which tripping causes switching between said first tensioning phase and said second tensioning phase, can also be used for Recovery Accumulator 46 to ensure that the actual pressure in Recovery Accumulator 46 is not lower than its design pressure.

Another approach for switching between said first tensioning phase and said second tensioning phase is by using pressure gauges or differential pressure switches. Switching between said first tensioning phase and said second tensioning phase should occur while the pressure in Recovery Accumulator 46 is higher than the pressure of the chamber of Linear Actuator 20 it is pressurizing. In order to ensure this, pressure gauges that monitor the pressure in Recovery Accumulator 46 and the pressures in the chambers of Linear Actuator 20, and transmit their information to a controlling computer can be used. Or alternately, differential pressure switches that trip when the pressure in the chamber of Linear Actuator 20 that is being pressured is equal or "lower within a pre-set value" relative to the pressure in Recovery Accumulator 46 can be used instead of said pressure gauges; here tripping of a differential pressure switch should cause switching between said first tensioning phase and said second tensioning phase.

Figure 30:
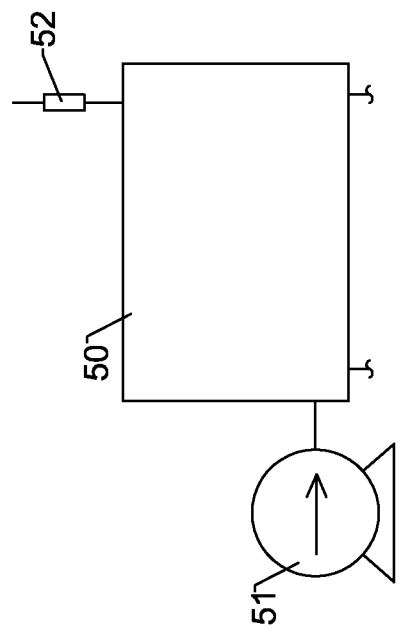
FIG. 30 shows a schematic diagram of an Accumulator 50 that is pressurized by a Braking Recovery Pump 51 and that has a Bleed Valve 52.

If desired the accumulators (such as Pressure Accumulator 44 and Recovery Accumulator 46) can also be pressurized using a braking recovery pump, which is pump that is powered by the braking action of a vehicle. Here in order to prevent an accumulator from over-pressurizing, it is recommended that a bleed valve that allows excess pressure to escape from said accumulator is also used. A drawing of an Accumulator 50 that is pressurized by a Braking Recovery Pump 51 and has a Bleed Valve 52 is shown in FIG. 30.

Figure 31:
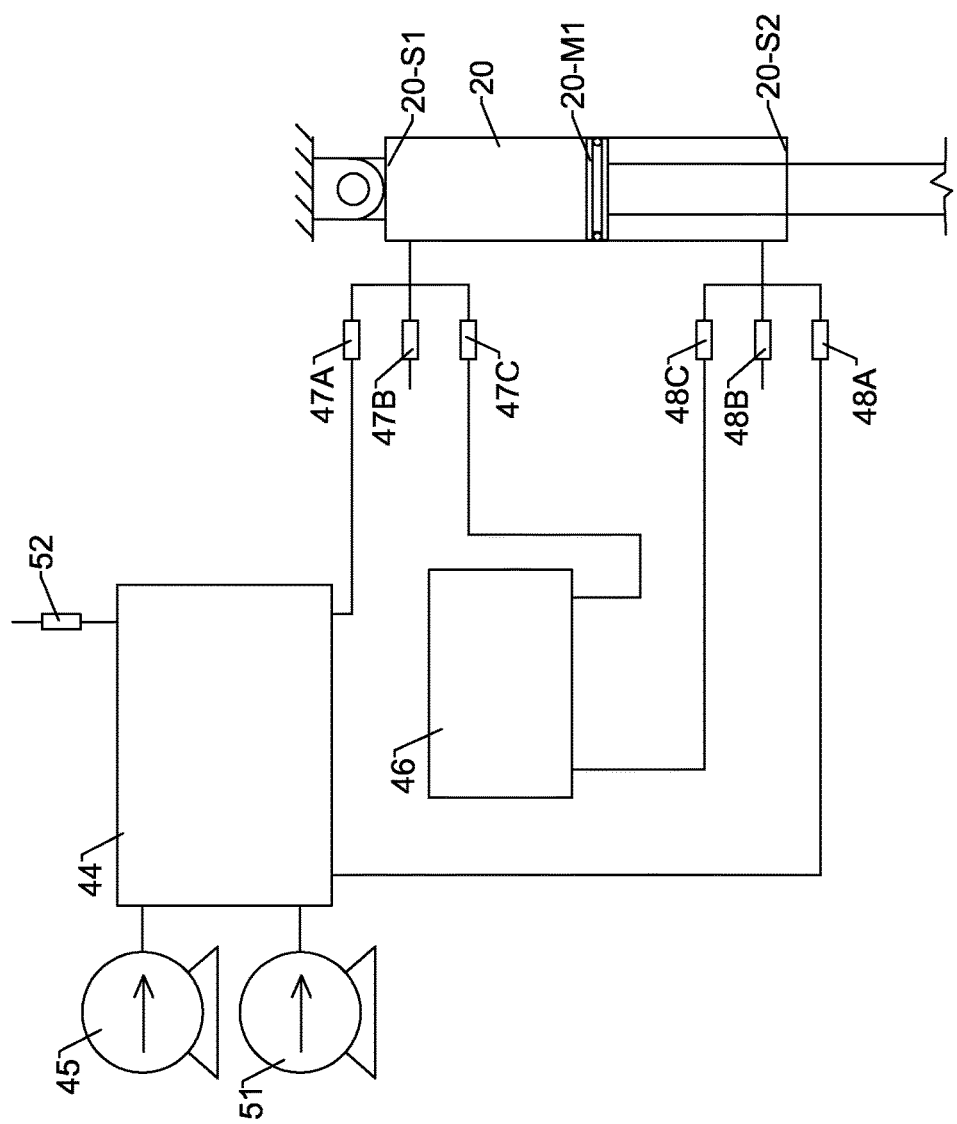
FIG. 31 shows a schematic diagram of the pneumatic "Recovery System" of FIG. 27 for which a Braking Recovery Pump 51 and a Bleed Valve 52 are added to Pressure Accumulator 44.

A drawing of the pneumatic "Recovery System" of FIG. 27 for which a Braking Recovery Pump 51 and a Bleed Valve 52 are added to Pressure Accumulator 44 is shown in FIG. 31. Obviously a Braking Recovery Pump 51 and/or a Bleed Valve 52 can also be added to all other accumulators of this disclosure.

If desired a Pump 45 (shown in FIGS. 27 to 29) can also be arranged so that it is powered by the braking action of its vehicle when available or when available and desired, and powered by other means for powering a pump (such as a motor, engine, etc.) when needed. Here clutches that can engage and disengage an input to Pump 45 can be used for each input to Pump 45 (which can be braking action power, means for powering a pump, etc.).

Alternate Embodiment

Lever Indexing Mechanisms Using an Index Bar
(FIGS. 32, 33, 34, 35, and 36)

Figure 32:
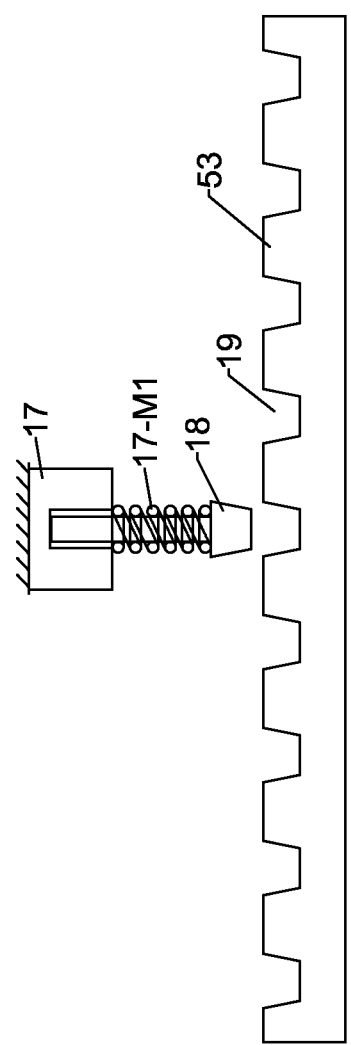
FIG. 32 shows an index bar 53.

For the "Lever Indexing Mechanism" and the "Lever Indexing Mechanism 2" described earlier, the index wheel 16 can be replaced with an index bar 53, shown in FIG. 32.

Like an index wheel 16, which has cavities 19, a lock 18, a locking-unlocking solenoid 17, and a spring 17-M1 (see FIG. 15); index bar 53 also has cavities 19, a lock 18, a locking-unlocking solenoid 17, and a spring 17-M1 (see FIG. 32). The cavities and lock of index bar 53 have the same functions and operate identically as the cavities and lock of index wheel 16. The only difference is that for index bar 53, the cavities are positioned lengthwise instead circumferential. In addition, index wheel 16 and index bar 53 are mounted on different parts (see next paragraph). Also, besides using locking-unlocking solenoid 17 and spring 17-M1 to control lock 18 (see "Lever Indexing Mechanism" and "Lever Indexing Mechanism 2" sections), other means for controlling lock 18 can also be used.

While index wheel 16 is mounted so that it rotates with the "rotational input device that controls the linear position of the item that is moved linearly by its Lever Indexing Mechanism or its Lever Indexing Mechanism 2" (such as the gear of a gear rack, the screw of a linear actuator, etc.); index bar 53 is mounted so that it "moves linearly with the item that is moved linearly by its Lever Indexing Mechanism or its Lever Indexing Mechanism 2".

If used for a CVT, index wheel 16 is mounted so that it rotates with the "rotational input device that controls the axial position of its cone (such as the gear of a gear rack, the screw of a linear actuator, etc.); and index bar 53 is mounted so that it "moves with its cone, when its cone is moved axially".

A "straight rotation to linear converting mover mechanism" described earlier, to which an index bar 53 (which has a lock 18, a locking-unlocking solenoid 17, and a spring 17-M1) is attached is partially shown as top-view in FIG. 33 and as a sectional-view in 34. Parts in FIGS. 33 and 34 that have the same labeling as the parts in FIGS. 23 and 24 are identical. The "straight rotation to linear converting mover mechanisms" shown in FIGS. 33 and 34 and in FIGS. 23 and 24, are used to move a cone with one torque transmitting member 43.

If used to move an item linearly (which is the case in this section), a "Lever Indexing Mechanism 2" and "Lever Indexing Mechanism" can be divided into three mechanisms which are: a) Rotation Providing Mechanism, b) Rotation to linear converting mover mechanism, and c) Indexing and Clutching Mechanism. If desired, a "Lever Indexing Mechanism 2" and "Lever Indexing Mechanism" that uses an index wheel 16 can also be used to only provide a rotational output; if so, the "rotation to linear converting mover mechanism" is not needed.

A "Rotation Providing Mechanism" is used to provide the quick stepwise rotations for the "rotation to linear converting mover mechanism"; examples of a "rotation to linear converting mover mechanism" are a gear-gear rack drive and a rotating screw-carriage drive.

A "Rotation Providing Mechanism" mainly comprises of an actuator lever, the parts that make the actuator lever rotate (which are its linear actuator 20 and its tension springs), and the stops that limit the clockwise and counter-clockwise rotation of the actuator lever. One "Rotation Providing Mechanism" can be used to rotate one or multiple "Indexing and Clutching Mechanisms".

And an "Indexing and Clutching Mechanism" is used to lock and unlock the position of the item that is moved by a "Lever Indexing Mechanism 2" and a "Lever Indexing Mechanism"; and is used and to engage and disengage the "Rotation Providing Mechanism" with the rotational input (gear of a gear-gear rack drive, screw of a rotating screw-carriage drive) of its "rotation to linear converting mover mechanism" as needed through the use of a clutch 22.

An "Indexing and Clutching Mechanism" mainly comprises of an "index bar 53 with its locking mechanism (lock 18, locking-unlocking solenoid 17, spring 17-M1)" or an "index wheel 16 with its locking mechanism (lock 18, locking-unlocking solenoid 17, spring 17-M1)", which are used for locking and unlocking the position of the item that is moved by its "Lever Indexing Mechanism 2" or its "Lever Indexing Mechanism"; and a clutch 22, used for engaging and disengaging the "Rotation Providing Mechanism" with rotational input of its "rotation to linear converting mover mechanism". For a "Lever Indexing Mechanism 2" and a "Lever Indexing Mechanism" used for a CVT, index wheel 16 and index bar 53 are used to lock and unlock the axial position of their cone.

If a "rotating screw-carriage drive" for which the carriage drive cannot rotate its screw is used, then no mechanism to lock and unlock the position of the item that is moved by a "Lever Indexing Mechanism 2" and a "Lever Indexing Mechanism" (as provided by an index bar 53 or index wheel 16) is needed. Here, if it is desired to use a mechanism to lock and unlock the position of the item that is moved, then an index wheel 16 should be used; since here, if the item moved is slightly out of position, an index bar 53 will not be able to move the item moved during locking.

Figure 35:
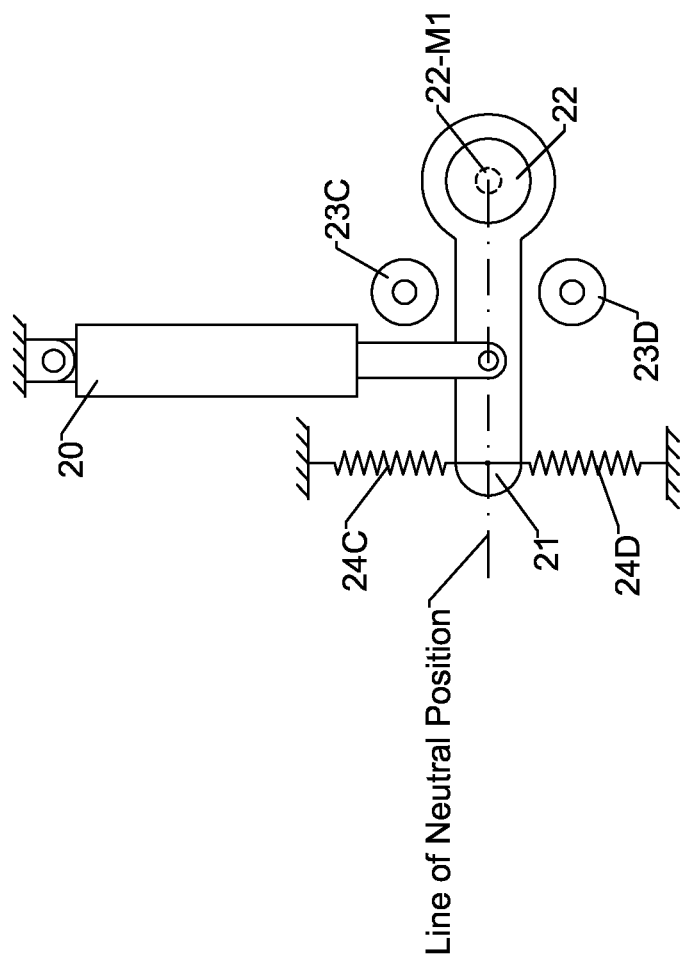
FIG. 35 shows a front-view of all parts of a "Lever Indexing Mechanism 2" that uses an index bar 53, except for its index bar 53 and its locking mechanism (lock 18, locking-unlocking solenoid 17, and spring 17-M1).

The "Rotation Providing Mechanism" of a "Lever Indexing Mechanism 2" and a "Lever Indexing Mechanism" that uses an index bar 53 is identical to the "Rotation Providing Mechanism" of a "Lever Indexing Mechanism" and a "Lever Indexing Mechanism 2" that uses an index wheel 16 described earlier, except that it does not have an index wheel 16. The output shaft of a "Lever Indexing Mechanism 2" and a "Lever Indexing Mechanism" that uses an index bar 53 is not mounted on index wheel 16, but mounted/fixed on the output half of clutch 22. The output shaft of "Lever Indexing Mechanism 2" that uses an index bar 53 is shown in FIG. 35, where it is labeled as output shaft 22-M1. Output shaft 22-M1 can be used to attach the item that is rotated by its "Lever Indexing Mechanism 2", such as a gear of a gear-gear rack drive or a screw of a rotating screw-carriage drive for example.

For the "Rotation Providing Mechanism" of a "Lever Indexing Mechanism 2" and a "Lever Indexing Mechanism" that uses an index bar 53 shown in FIG. 35, clutch 22 is used controllably engage and disengage output shaft 22-M1 with actuator lever 21; actuator lever 21 is mounted so that it can rotate about a pivot point that is co-centric with the center of output shaft 22-M1, for such purpose actuator lever 21 can have a pivot shaft, pivot hole, etc. (not shown). When clutch 22 is engaged, rotation from the actuator lever 21 is transferred to output shaft 22-M1; and when clutch 22 is disengaged, actuator lever 21 is allowed to rotate relative to output shaft 22-M1.

The recommended clutch to be used for clutch 22 is a jaw clutch or toothed clutch, although other clutches that can be controllably engaged and disengaged by the controller/controlling computer can also be used. A jaw clutch can comprise of two jaw gears, one fixed for rotation relative to output shaft 22-M1 and the other fixed for rotation relative to the actuator lever 21, that can be pushed together so as to have the clutch engaged and pushed apart so as to have the clutch disengaged. A jaw gear can be shaped like a flat washer that has at least one flat surface that is toothed. The toothed surfaces of the jaw gear of output shaft 22-M1 and the jaw gear of the actuator lever 21 face each other and can be made to engage and disengage through the use of a solenoid and a spring or other actuators. Here when engaged, no significant relative rotational movements between the jaw gears should occur.

The output shaft 22-M1 of a "Lever Indexing Mechanism 2", which if used for a CVT is used to rotate the "rotational input device(s) that each control the axial position of a cone" (gear of a gear rack, screw of a linear actuator, etc.), is shown as a top-view in FIG. 33. In FIG. 33, gear 39 of gear rack 40, which is used to move a cone with one torque transmitting member 43, is attached to output shaft 22-M1.

Instead of being rotated directly by an actuator lever 21 of a "Lever Indexing Mechanism" and a "Lever Indexing Mechanism 2", an output shaft 22-M1 and an index wheel 16 can also be rotated indirectly by an actuator lever 21. Here one or several means for coupling (such as gears, sprockets, chains, pulleys, belts, shafts, etc.) can be used to couple a clutch 22 of an output shaft 22-M1 or an index wheel 16 to its actuator lever 21. Using this arraignment, an actuator lever 21 can be used to rotate multiple output shafts 22-M1 and/or multiple index wheels 16, which each can be individually engaged and disengaged with said actuator lever 21 through their clutches 22.

Figure 36:
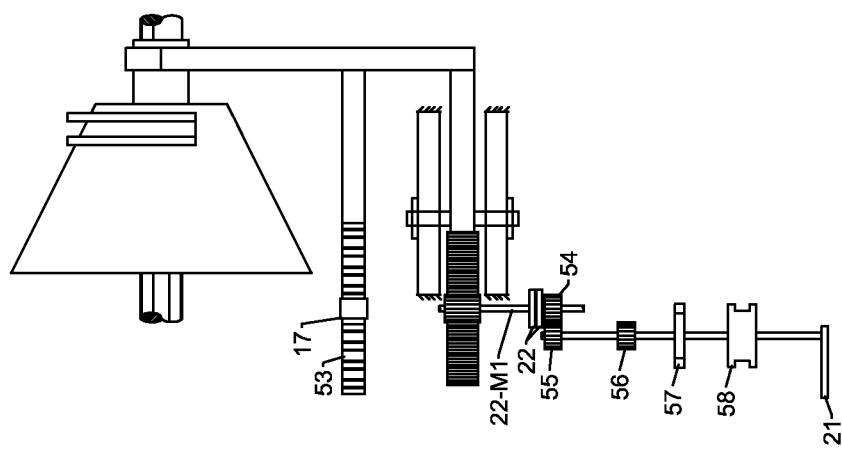
FIG. 36 shows a top-view of a "straight rotation to linear converting mover mechanism" for which an output shaft 22-M1 is coupled to an actuator lever 21 through coupling gears.

An output shafts 22-M1 that can be engaged and disengaged with a coupling gear 54 through a clutch 22 is shown in FIG. 36. Coupling gear 54 is then coupled to an actuator lever 21 through coupling gear 55. As described earlier, actuator lever 21 also has tension springs and a linear actuator 20; although there, these items are not shown in FIG. 36. Also shown in FIG. 36 is a coupling gear 56, sprocket 57, and a pulley 58 that each can be used to couple actuator lever 21 to another clutch 22 of an output shafts 22-M1 or of an index wheel 16 through the use of other means for coupling (such as gears, sprockets, chains, pulleys, belts, shafts, etc.).

If used for a CVT, like index wheel 16, index bar 53 is used to lock and unlock the axial position of its cone. And during the operation of a "Lever Indexing Mechanism" and a "Lever Indexing Mechanism 2" using an index bar 53, index bar 53 is locked and unlocked in the same manner as index wheel 16. In other words, the operational steps of the "Lever Indexing Mechanism" and the "Lever Indexing Mechanism 2" that uses an index bar 53 is identical to the operational steps of the "Lever Indexing Mechanism" and the "Lever Indexing Mechanism 2" that uses index wheel 16, except that index bar 53 performs the functions of index wheel 16. In order to help clarify this, the operational steps of a "Lever Indexing Mechanism 2" using an index bar 53 is described in the following two paragraphs. The additional details regarding the operation of a "Lever Indexing Mechanism" and a "Lever Indexing Mechanism 2" using an index wheel 16 as described in the "Lever Indexing Mechanism" and "Lever Indexing Mechanism 2" sections, although not shown here, are also applicable here.

The operational steps of a "Lever Indexing Mechanism 2" using an index bar 53 are as follows, if clockwise rotation is required then the following steps can be used:

a) during the initial stage, the index bar 53 is locked and the clutch 22 disengaged;

b) the linear actuator 20 rotates the actuator lever 21 to stop 23D if required, so as to pre-tension tension spring 24C;

c) the clutch 22 is engaged;

d) the index bar 53 is unlocked;

e) all forces of the linear actuator 20 are released so that the linear actuator 20 will not prevent tension spring 24C from rotating the actuator lever 21 to the neutral position. If solenoids are used, then the solenoids can simply be deactivated. If pneumatics (preferred) or hydraulics are used for the linear actuator 20, then a vent valve that vents all the pressure in the pressurized chamber of linear actuator 20 can be used. Here it also recommended that there is no significant vacuum pressure in the chamber of the pneumatic or hydraulic linear actuator that expands as the forces of the pneumatic or hydraulic linear actuator are released; this can be ensured through the use of a vacuum prevention valve that can be controllably opened and closed so as to expose the chamber of the pneumatic or hydraulic linear actuator that "expands as the forces of the pneumatic or hydraulic linear actuator are released" to atmospheric pressure.

f) the pulling/releasing force of locking-unlocking solenoid 17 on the lock 18 is stopped so that the lock 18 is pushed towards the index bar 53 by spring 17-M1;

g) once the lock 18 can slide into the next cavity 19 of the index bar 53, it will do so and lock the index bar 53;

h) once the index bar 53 is locked or once the lock 18 has started to slide into the next cavity 19 of the index bar 53, the clutch 22 can be disengaged.

And if counter-clockwise rotation is required then the following operational steps can be used:

a) during the initial stage, the index bar 53 is locked and the clutch 22 disengaged;

b) the linear actuator 20 rotates the actuator lever 21 to stop 23C if required, so as to pre-tension tension spring 24D;

c) the clutch 22 is engaged;

d) the index bar 53 is unlocked;

e) all forces of the linear actuator 20 are released so that the linear actuator 20 will not prevent tension spring 24D from rotating the actuator lever 21 to the neutral position. If solenoids are used, then the solenoids can simply be deactivated. If pneumatics (preferred) or hydraulics are used for the linear actuator 20, then a vent valve that vents all the pressure in the pressurized chamber of linear actuator 20 can be used. Here it also recommended that there is no significant vacuum pressure in the chamber of the pneumatic or hydraulic linear actuator that expands as the forces of the pneumatic or hydraulic linear actuator are released; this can be ensured through the use of a vacuum prevention valve that can be controllably opened and closed so as to expose the chamber of the pneumatic or hydraulic linear actuator that "expands as the forces of the pneumatic or hydraulic linear actuator are released" to atmospheric pressure.

f) the pulling/releasing force of locking-unlocking solenoid 17 on the lock 18 is stopped so that the lock 18 is pushed towards the index bar 53 by spring 17-M1;

g) once the lock 18 can slide into the next cavity 19 of the index bar 53, it will do so and lock the index bar 53;

h) once the index bar 53 is locked or once the lock 18 has started to slide into the next cavity 19 of the index bar 53, the clutch 22 can be disengaged.

Figure 37:
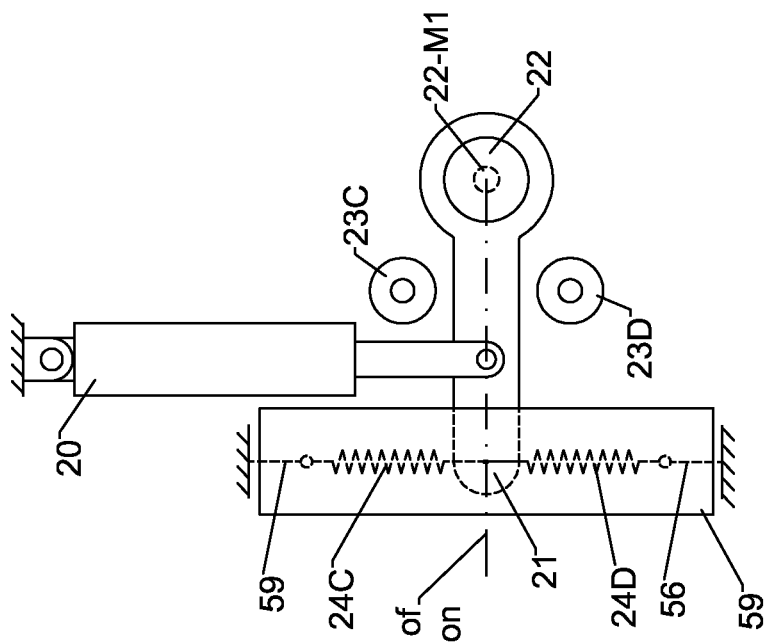
FIG. 37 shows a front-view of a "Lever Indexing Mechanism 2" that uses anchoring cables 59 and side walls 60.
Figure 38:
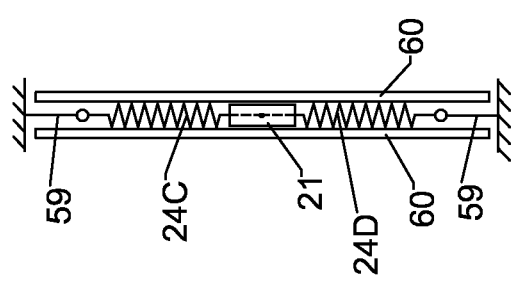
FIG. 38 shows a partial side-view of a "Lever Indexing Mechanism 2" that uses anchoring cables 59 and side walls 60.

Lever Indexing Mechanisms Using Anchoring Cables (FIGS. 37 and 38)

For the "Rotation Providing Mechanism" of a "Lever Indexing Mechanism" and a "Lever Indexing Mechanism 2", in order to allow for some non-contorting movements of a tension spring (such as tension spring 24A, tension spring 24B, tension spring 24C, or tension spring 24D) as the tension spring opposite of it is being tensioned, the "non-actuator lever" ends of the tension springs can be secured to their frame/housing using anchoring cables 59. A "Rotation Providing Mechanism" of a "Lever Indexing Mechanism 2" for which anchoring cables 59 are used is show in FIG. 37. Here in order to securely place the tension springs within their housing, parallel side walls 60, which are shown as a front-view in FIG. 37 and as a side-view in FIG. 38 can be used.

Detailed Design Example for a Lever Indexing Mechanism 2 Using an Index Bar

Detailed Design for "Rotation Providing Mechanism" (FIGS. 39, 40, 41, and 42)

Figure 39:
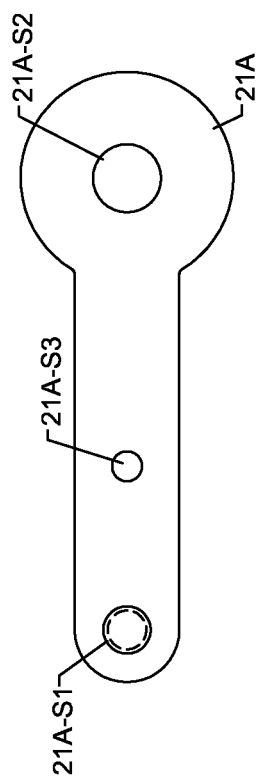
FIG. 39 shows a front-view of an actuator lever 21A.
Figure 40:
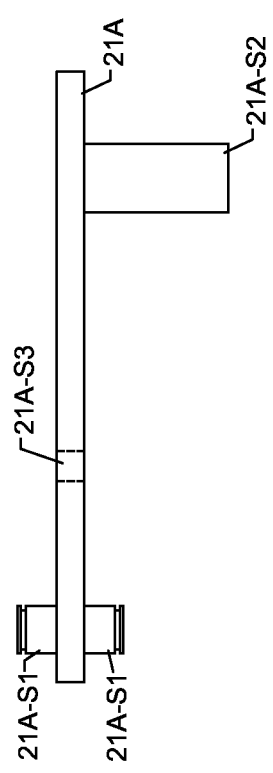
FIG. 40 shows a top-view of an actuator lever 21A.

A detailed design for an alternate actuator lever 21, labeled as actuator lever 21A, for a "Rotation Providing Mechanism" described in the next paragraph is shown as a front-view in FIG. 39 and as a top-view in FIG. 40. It is shaped like an elongated plate that near one end has two co-centric "spring end mounting shafts 21A-S1", which each has a locking ring groove, and at the other end has a "pivot shaft 21A-S2", which can be used to rotate one or several clutches 22 directly or through one or several means for coupling (such as gears, sprockets, chains, pulleys, belts, shafts, etc.).

In addition, actuator lever 21A (see FIGS. 39 and 40) also has a "linear actuator hole 21A-S3" that can be used to attach an end of a linear actuator 20 to actuator lever 21A by inserting a round rod through holes in the connecting plates of linear actuator 20 and "linear actuator hole 21A-S3".

A detailed "Rotation Providing Mechanism" of a "Lever Indexing Mechanism 2" that uses an actuator lever 21A is shown as a partial front-view in FIG. 41 and as a partial side-view in FIG. 42. For this design, in order to reduce rotating friction, each anchoring cable 59 is attached to its frame using a pulley 61 on which it tightly wrapped around and secured using a cable clamp.

And for this design, in order to attach the tension spring ends of tension spring 24C and tension spring 24D to a "spring end mounting shaft 21A-S1" each (see FIGS. 41 and 42), first a "spring end bearing 62" is slid onto a spring end mounting shaft 21A-S1, then the end loop of a tension spring is slid onto the "spring end bearing 64", then a "spring end bracing sleeve 63" that prevents said end loop from sliding axially is slid onto the "spring end bearing 64", all items are then secured through looking ring 64.

The "Rotation Providing Mechanism" of a "Lever Indexing Mechanism 2" shown in FIGS. 41 and 42, pivots/rotates about the center of pivot shaft 21A-S2, which can be supported by bearings or other means that is/are fixed to the frame of the CVT. In order to pre-tension a tension spring (tension spring 24C or tension spring 24D), actuator lever 21A is rotated by linear actuator 20 towards stop 23C or stop 23D, depending whether clockwise or counter-clockwise rotation is required. Once at a stop (stop 23C or stop 23D), the pre-tensioned tension spring can be used to rotate actuator lever 21A towards the neutral position. Stop 23C and stop 23D are fixed to the frame of the CVT.

Detailed Design for "Indexing and Clutching Mechanisms" and "Rotation to Linear Converting Mover Mechanisms" (FIGS. 43, 44, 45, and 46)

Figure 43:
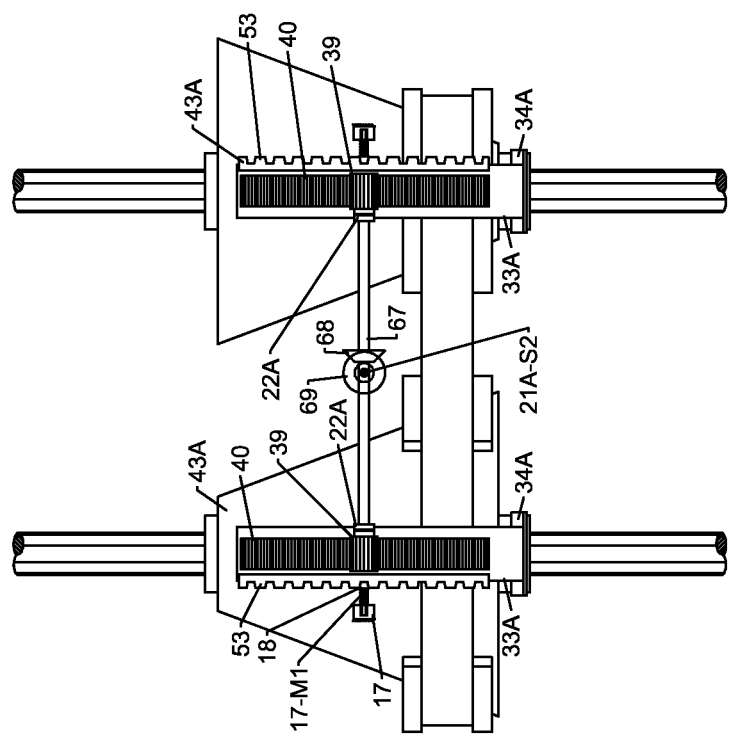
FIG. 43 shows a partial top-view of a CVT that uses a "Lever Indexing Mechanism 2" for which one "Rotation Providing Mechanism" is used for two "Indexing and Clutching Mechanisms".
Figure 46:
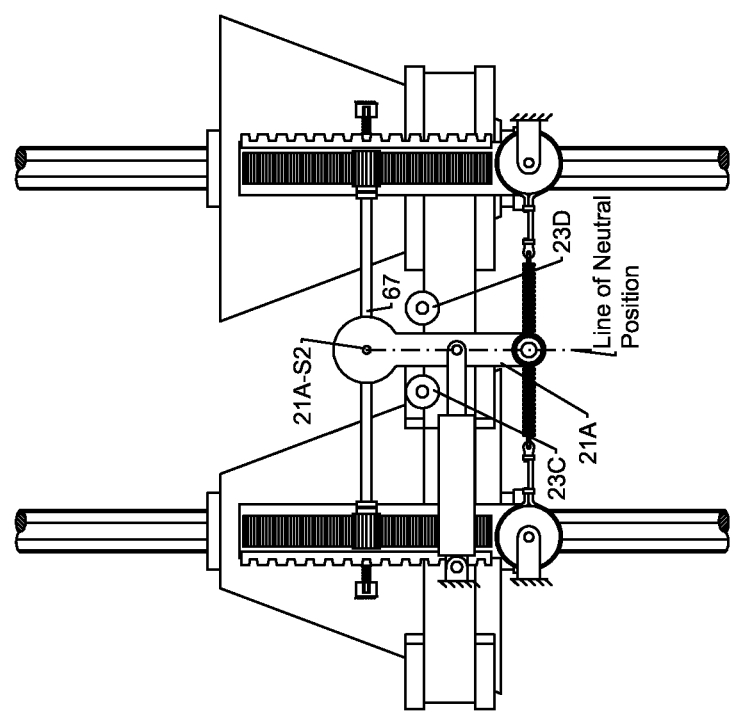
FIG. 46 shows a top-view of a CVT that uses a "Lever Indexing Mechanism 2" for which one "Rotation Providing Mechanism" is used for two "Indexing and Clutching Mechanisms".

An example of two "Indexing and Clutching Mechanisms" that each uses an index bar 53 is shown in FIG. 43. FIG. 43 shows a partial top-view and FIG. 46 shows a top-view of a CVT that uses a "Lever Indexing Mechanism 2" where one "Rotation Providing Mechanism" is used for two "Indexing and Clutching Mechanisms". FIG. 43 only shows the bevel gear 69 that is fixed (fixed for rotational and axial movements) to "pivot shaft 21A-S2" of the "Rotation Providing Mechanism", while FIG. 46 shows the entire "Rotation Providing Mechanism". The CVT shown uses two cones 43A, which each use a separate "Indexing and Clutching Mechanism" and a separate "Rotation to Linear Converting Mover Mechanism" (see FIG. 43), and a common "Rotation Providing Mechanism" (see FIG. 46).

Each "Rotation to Linear Converting Mover Mechanism" is used to convert the rotational output of the "Rotation Providing Mechanism" into linear movements that move a cone 43A axially; a cone 43A is a cone with one torque transmitting member that also has a non-torque transmitting member. The "Rotation to Linear Converting Mover Mechanism" design used in FIG. 43, is shown in detail as a side-view in FIG. 44 and as a top-view in FIG. 45. Here a gear rack 40 is connected to its cone 43A through a mover rod 33A and mover connector 34A. Mover rod 33A is an elongated flat plate on which a gear rack 40 is attached. And at one end of mover rod 33A, mover connector 34A is fixed. Mover connector 34A is an elongated flat plate, which has a hole through which an end of its cone 43 can be slid in and secured for axial but not rotational movements relative to said mover connector 34A using a lock ring.

A mover rod 33A (on which gear rack 40 is fixed) is positioned on top of its cone 43A, and "slides along the axial direction of its cone 43A" with its cone 43A. In order to maintain the rotational position of a mover rod 33A relative to its cone 43A and in order to help support the weight of a mover rod 33A if necessary, guides, rails, rollers, etc., can be used. For such purpose, in FIG. 44, a roller 65 on which mover rod 33A rests and one of two rollers 66 with which a side surface of mover rod 33A engages are shown; and in FIG. 45, both rollers 66, which each engage with a side surface of mover rod 33A are shown.

Each "Indexing and Clutching Mechanism" shown in FIG. 43 is used to lock and unlock the axial position of its cone 43A and engage/disengage the "Rotation Providing Mechanism" (see FIG. 46) with its gear 39. Here each "Indexing and Clutching Mechanisms" comprises of an index bar 53 and its indexing locking mechanism (which here comprise of a lock 18, a locking-unlocking solenoid 17, and a spring 17-M1), and a clutch 22A. Clutch 22A is preferably a jaw clutch or toothed clutch, but other type of clutches can also be used.

Each index bar 53 and its locking mechanism is used to lock and unlock the axial position of its cone 43A. An index bar 53 is shaped and fixed to the mover rod 33A of its cone 43A (see FIG. 43) in a manner so that it can lock and unlock the axial position of its cone 43A for all operating axial positions of its cone 43A. And the locking mechanism of each index bar 53 is fixed to the frame of its CVT and positioned so that it can lock and unlock its index bar 53 for all operating axial positions of its cone 43A.

A clutch 22A (see FIG. 43) is used to controllably engage and disengage the output rotation of its "Rotation Providing Mechanism" (see FIG. 46) with a gear 39 of a gear rack 40 of a cone 43A (see FIG. 43). When a clutch 22A is engaged, the output rotation of the "Rotation Providing Mechanism" can be used to rotate the gear 39 of said clutch 22A so as to move its gear rack 40 (and as such also move its cone 43A axially) as needed. And when a clutch 22A is disengaged, the output rotation of the "Rotation Providing Mechanism" can freely rotate relative to the gear 39 of said clutch 22A; this allows for the rotation of the "Rotation Providing Mechanism" that is needed to pre-tension its tension springs; and this also allows the "Rotation Providing Mechanism" to be used to rotate only the gear 39 of the other clutch 22A when it is engaged, so that the axial position of each cone 43A can be changed independently of each other.

It is preferred that in order to change the transmission ratio of the CVT, the axial position of each cone 43A is changed independently so that the axial position of each cone 43A is changed when it is in a moveable position regardless of the rotational position of the other cone 43A (see U.S. patent application Ser. No. 14/242,899 for details).

Each clutch 22A comprises of two halves that can be engaged and disengaged. The first half is rotationally fixed to the output rotation of the "Rotation Providing Mechanism", and the second half is rotationally fixed to a gear 39. In FIG. 43, the first halves of the clutches 22A are rotationally fixed to the output rotation of the "Rotation Providing Mechanism" through a clutch shaft 67, on which is bevel gear 68 is fixed (fixed for rotational and axial movements relative to clutch shaft 67). Bevel gear 68 is coupled to a bevel gear 69; and bevel gear 69 is fixed to "pivot shaft 21A-S2" of the "Rotation Providing Mechanism", which is not shown in FIG. 43 but shown in FIG. 46.

For the "Rotation Providing Mechanism" of FIG. 46, the rotation of the actuator lever 21A from a stop (stop 23C or stop 23D) towards its neutral position should result in an axial movement of a cone 43A (which clutch 22A is engaged) that increases or decreases the circumferential length of its transmission diameter by one tooth, and in an axial movement of the index bar 53 of said cone 43A that moves said index bar 53 from one cavity to the next.

Sample Calculations for a Lever Indexing Mechanism 2

A rough sample calculation for a "Lever Indexing Mechanism 2" that is used to move a "cone with one torque transmitting member" axially is described below. Let's say for the cone with one torque transmitting member (also referred to as "cone" or "the cone" in this section), the smallest transmission diameter, Dsmall, is 3 inches and the largest transmission diameter, Dlarge, is 6 inches. In addition, the length of the cone from Dsmall to Dlarge is 6 inches, and the pitch length of a tooth of the torque transmitting member is 0.25 inches. For this setup, the number of teeth at Dsmall are approximately 75, and the number of teeth at Dlarge are approximately 150. As such the difference in the amount of teeth from Dsmall to Dlarge is 75 teeth. Since a difference of 75 teeth is achieved over a length of 6 inches. The length (axial distance), S, that the cone has to be moved for a transmission diameter increase or decrease of 1 tooth is: S=6 inches/75 teeth=0.08 inches.

And let's say the maximum rotating speed at which axial position changing of the cone is allowed, rpm_max, is 3000 rpm, and axial position changing of the cone has to be performed during a duration of ¾ of a revolution of the cone. Then the maximum time, t, at which the axial position of the cone can be changed is: t=(¾)/(3000 rpm)=0.00025 minutes=0.015 seconds.

In order to calculate the acceleration, a, needed to move the cone we use: S=0.5*a*t^2, from which we get: a=2*S/t^2. Using our earlier results we get: a=2*0.08/0.015^2=711 inches/seconds^2=18 meters/seconds^2.

Assuming that the mass of the cone and its mechanisms to be moved axially, m, is 5 kg; then the Force, F, needed to move the cone is: F=m*a=5*18=90 Newtons=20 lbs.

For a "Lever Indexing Mechanism 2", the force to move a cone is provided by a pre-tensioned tension spring, and the force of the pre-tensioned tension spring decreases as its actuator lever rotates towards its neutral position. The 20 lbs force required, as calculated above, assumes that a constant 20 lbs force is applied on the cone. In order to compensate for this, the pre-tensioned tension spring needs to provide an initial force, F_initial, of: 2*F=2*20 lbs=40 lbs. Here if the final force provided by the pre-tensioned tension spring is 0, then the average acceleration provided by the pre-tensioned tension spring is equal to the average acceleration provided by a constant 20 lbs force. The calculation described here is only a ballpark estimation; the actual initial force needed can be easily obtained and refined through experimentation.

The impact velocity of the cone as it hits its stopping/final position is: v_impact=a*t=18*0.015=0.27 meters/second. The dropping height, h_dropping, for the impact velocity can be determined from the following: t=v_impact/gravity=0.27/9.81=0.028 seconds, and h_dropping=0.5*gravity*t^2=0.5*9.81*0.028^2=0.0038 meters=0.38 cm.

Using the same equations above except for different rpm values, we get the following values for rpm_max=4000 rpm: F_initial=72 lbs, h_dropping=0.67 cm; and the following values for rpm_max=6000 rpm: F_initial=162 lbs, h_dropping=1.5 cm.

The values calculated in this section are only ballpark estimates from which more accurate values can be obtained through experimentation. For reliability purposes, it is also recommended that a factor of safety, such as factor of safety of 1.5 or 2 for example, is used for the values for F_initial.

In order to damp the impact that occurs when a moved cone hits its stopping position, a Recovery System described earlier can be used to damp/brake the cone before it hits its stopping position. For a Recovery System, the braking force is provided by the pressurized gas or liquid in Recovery Accumulator 46. In order to determine the right amount the pressure in Recovery Accumulator 46, trial and error experimentation can be used.

For example, during trial and error experimentation, the pressure in Recovery Accumulator 46 can be increased/decreased in increments (such as 1 lbs, 2 lbs, 5 lbs, etc., increments for example), while adjusting the force for F_initial and "the duration when damping is active" until an acceptable "axial position changing duration" and "stopping impact force" are obtained.

"The duration when damping is active" depends on when the pressure in Recovery Accumulator 46 is started to be used to damp/brake the cone moved during axial position changing of the cone. If the tension in the transmission belt of the cone is reduced so that the resisting force for moving a cone is negligible (refer to U.S. patent application Ser. No. 14/182,306 and Ser. No. 14/186,853); then it is preferred that a timer is used to trigger when the pressure in Recovery Accumulator 46 is started to be used to damp/brake the cone moved during axial position changing of the cone. The timer can be a time delay that activates damping/braking after a pre-determined duration from when axial position changing of the cone was started.

Preferred Embodiment of the Invention (Best Mode)

The preferred embodiment of this invention is a Lever Indexing Mechanism 2 using an Index Bar described in the "Detailed Design Example for a Lever Indexing Mechanism 2 using an Index Bar" section. This Lever Indexing Mechanism 2 comprises of a Rotation Providing Mechanism, Rotation to Linear Converting Mover Mechanism, and Indexing and Clutching Mechanism. In the example given, this Lever Indexing Mechanism 2 is used to move the cones of a CVT axially. All other mechanisms are also useful and have merit, but are less preferred.

CONCLUSION, RAMIFICATIONS, AND SCOPE

While my above description contains many specificities, these should not be construed as limitations on the scope, but rather as an exemplification of one or several embodiment(s) thereof. Many other variations are possible. In addition, the mechanisms of this invention can be used for other applications besides CVT's.

Accordingly, the scope should be determined not by the embodiment(s) illustrated, but by the appended claims and their legal equivalents.

I claim:

1. An indexing mechanism that can be used to move an item of a pre-determined weight, the indexing mechanism comprising
   a) an index bar that has lengthwise cavities into which a lock can be inserted; when said lock is inserted into a selected cavity of the lengthwise cavities, linear movements of said item is locked; and when said lock is not inserted into the selected cavity of the lengthwise cavities, said linear movements of said item is allowed;
   b) means for controlling said lock;
   c) an output shaft;
   d) a rotation to linear converting mover mechanism, which converts a rotational input provided by the output shaft to the linear movements of said item and said index bar;
   e) an actuator lever that can rotate about a pivot point that is co-centric with a center of said output shaft;
   f) a clutch that can controllably engage and disengage said actuator lever with said output shaft; when said actuator lever is engaged with said output shaft, a rotation from said actuator lever is transferred to said output shaft; and when said actuator lever is disengaged with said output shaft, said actuator lever is allowed to rotate relative said output shaft;
   g) means for rotating said actuator lever that can be used to rotate said actuator lever clockwise and counter-clockwise;
   h) a first stop and a second stop, said first stop is used to limit the clockwise rotations of said actuator lever, and said second stop is used to limit the counter-clockwise rotations of said actuator lever; rotating said actuator lever from a position where said actuator lever is in contact with said first stop to a neutral position, which is a mid-point position between said first stop and said second stop, causes said index bar to move from the selected cavity of the lengthwise cavities to a next cavity of the lengthwise cavities, and rotating said actuator lever from a position where said actuator lever is in contact with said second stop to said neutral position also causes said index bar to move from the selected cavity of the lengthwise cavities to another next cavity of the lengthwise cavities,
   i) a first tension spring and a second tension spring; said first tension spring is attached to said actuator lever in a manner so that the first tension spring can be tensioned by rotating said actuator lever from said neutral position towards said first stop; and in a manner so that tension of the first tension spring can be used to rotate said actuator lever from said first stop towards said neutral position; and said second tension spring is attached to said actuator lever in a manner so that the second tension spring can be tensioned by rotating said actuator lever from said neutral position towards said second stop; and in a manner so that tension of the second tension spring can be used to rotate said actuator lever from said second stop towards said neutral position.

2. The indexing mechanism of claim 1, wherein said means for rotating said actuator lever is a pneumatic or hydraulic cylinder that is powered and controlled by a pneumatic or hydraulic system.

3. The indexing mechanism of claim 2, wherein said pneumatic or hydraulic system includes two vent/return valves, a first vent/return valve for a pulling chamber of a linear actuator and a second vent/return valve for a pushing chamber of said linear actuator, said two vent/return valves are used for releasing pressure in a pressurized chamber of said linear actuator during the rotation of said actuator lever towards said neutral position due to the tension of said first tension spring or said second tension spring.

4. The indexing mechanism of claim 3, wherein said indexing mechanism makes use of a damping and recovery system that can be used to dampen shock loads that occur during an operation of said indexing mechanism, and wherein said damping and recovery system comprises:
   a) means for connecting said pulling chamber of said linear actuator to a recovery accumulator;
   b) means for connecting said pushing chamber of said linear actuator to said recovery accumulator; and
   c) two recovery valves, a first recovery valve for exposing or sealing said pulling chamber to said recovery accumulator and a second recovery valve for exposing or sealing said pushing chamber to said recovery accumulator;
   d) wherein said recovery accumulator can store gas or fluid under pressure; during a braking interval, said recovery accumulator is used to brake the rotation of said actuator lever as said actuator lever is near said neutral position.

5. The indexing mechanism of claim 4 further comprising sensors, wherein said sensors are limit switches that can measure extension and retraction of said linear actuator.

6. The indexing mechanism of claim 4 further comprising sensors, wherein said sensors are differential pressure switches that trip when the pressure in the pressurized chamber of said linear actuator that is being pressured is equal or lower within a pre-set value relative to the pressure in said recovery accumulator.

* * * * *